United States Patent
Mudrick et al.

(10) Patent No.: US 11,938,987 B2
(45) Date of Patent: Mar. 26, 2024

(54) MODULAR LUGGAGE SYSTEM

(71) Applicant: ADVANCED TRAVEL SYSTEMS, INC., Castle Rock, CO (US)

(72) Inventors: David Mudrick, Prescott, AZ (US); John C. Botdorf, Castle Rock, CO (US); Bernard J. Perini, Bethpage, NY (US)

(73) Assignee: ADVANCED TRAVEL SYSTEMS, INC., Castle Rock, CO (US)

( * ) Notice: Subject to any disclaimer, the term of this patent is extended or adjusted under 35 U.S.C. 154(b) by 504 days.

(21) Appl. No.: 16/764,791

(22) PCT Filed: Nov. 16, 2018

(86) PCT No.: PCT/US2018/061651
§ 371 (c)(1),
(2) Date: May 15, 2020

(87) PCT Pub. No.: WO2019/099923
PCT Pub. Date: May 23, 2019

(65) Prior Publication Data
US 2020/0369308 A1 Nov. 26, 2020

Related U.S. Application Data

(60) Provisional application No. 62/587,134, filed on Nov. 16, 2017.

(51) Int. Cl.
*B62B 3/02* (2006.01)
*A45C 13/38* (2006.01)
(Continued)

(52) U.S. Cl.
CPC ............ *B62B 3/022* (2013.01); *A45C 13/385* (2013.01); *B62B 3/1468* (2013.01); *B62B 5/067* (2013.01); *B62B 5/02* (2013.01)

(58) Field of Classification Search
CPC ......... B62B 3/022; B62B 3/1468; B62B 3/02; A45C 13/385
See application file for complete search history.

(56) References Cited

U.S. PATENT DOCUMENTS 2,772,096 A * 11/1956 Hanson .................. A61G 5/061
280/5.24
4,114,914 A * 9/1978 Cohen ....................... B62B 3/02
280/30
(Continued)

FOREIGN PATENT DOCUMENTS

DE  202006012168 U1 * 1/2008 ........... A45C 13/385
DE  102013107391 A1 * 1/2015 ............... B62B 1/12
(Continued)

OTHER PUBLICATIONS

International Search Report dated Mar. 27, 2019 in International Application No. PCT/US2018/061651, 3 pages.
(Continued)

*Primary Examiner* — Steve Clemmons
(74) *Attorney, Agent, or Firm* — Berg Hill Greenleaf Ruscitti LLP

(57) ABSTRACT

The current invention may be to provide a modular luggage system having an at least one modular bag that may be configured to be secured to a cart configured to be fully-collapsible. In this embodiment, the collapsible adjustable cart may be configured in a nested configuration such that it may be a unibody structure that may be easily collapsed and stored, preferably in one or more modular bags. In this embodiment, the cart may further include a plurality of telescoping arms coupled to a base support as well as a plurality of extendable wheels secured to the base support through at least one wheel coupler. The adjustable support surface may be expandable through the use of one or more collapsible surfaces such that it may better accommodate
(Continued)

one or more modular bags. The invention may also provide a belt-mounted stair guide mechanism to assist a user maneuver an adjustable cart up stairs, or other irregular elevated surfaces.

20 Claims, 41 Drawing Sheets

(51) Int. Cl.
*B62B 3/14* (2006.01)
*B62B 5/06* (2006.01)
*B62B 5/02* (2006.01)

(56) References Cited

U.S. PATENT DOCUMENTS

| | | | | |
|---|---|---|---|---|
| 4,274,644 | A * | 6/1981 | Taylor | B62B 3/02 280/43.13 |
| 5,326,116 | A * | 7/1994 | Flax | B62B 3/02 D34/17 |
| 5,529,322 | A * | 6/1996 | Barton | A45C 5/14 280/30 |
| 5,626,352 | A * | 5/1997 | Grace | B62B 1/12 280/655 |
| 6,012,729 | A * | 1/2000 | Lin | B62B 1/125 280/654 |
| 6,095,531 | A * | 8/2000 | Khachatoorian | B62B 5/02 280/47.27 |
| 6,155,362 | A * | 12/2000 | Owens | B62B 5/02 180/9.22 |
| 6,220,611 | B1 * | 4/2001 | Shapiro | B62B 7/10 280/651 |
| 6,398,235 | B1 * | 6/2002 | Cary | B25H 3/00 280/47.35 |
| 6,543,796 | B1 * | 4/2003 | Johnson | B62B 1/12 280/30 |
| 6,880,851 | B1 * | 4/2005 | Summers | B62B 1/266 280/43.1 |
| 7,389,997 | B2 * | 6/2008 | Johnson | A45C 5/14 280/30 |
| 7,445,216 | B1 * | 11/2008 | Chou | B62B 1/142 280/638 |
| 7,784,816 | B2 * | 8/2010 | Jian | B62B 3/02 280/38 |
| 8,439,371 | B1 | 5/2013 | Vazquez | |
| 8,528,918 | B2 * | 9/2013 | Macias | B62B 3/02 280/47.35 |
| 8,979,098 | B2 * | 3/2015 | Wang | B62B 3/022 280/651 |
| 9,302,689 | B2 * | 4/2016 | Burton | B62B 1/12 |
| 9,498,055 | B2 * | 11/2016 | Distefano | A47B 13/088 |
| 9,956,978 | B1 * | 5/2018 | Worley | B62B 3/10 |
| 10,086,860 | B2 * | 10/2018 | Jian | B62B 5/067 |
| 2002/0153216 | A1 | 10/2002 | Krulik | |
| 2004/0094378 | A1 * | 5/2004 | Gandy | A45C 5/14 190/18 R |
| 2010/0253025 | A1 * | 10/2010 | Smith | B62B 1/12 280/47.27 |
| 2011/0115178 | A1 * | 5/2011 | De Sousa | B62B 3/1476 280/47.35 |
| 2012/0055122 | A1 * | 3/2012 | Beauchamp | B62B 1/12 108/44 |
| 2014/0110447 | A1 * | 4/2014 | Hilley | B62B 1/26 224/401 |
| 2014/0238799 | A1 * | 8/2014 | Sharma | B62B 1/125 108/18 |
| 2014/0271095 | A1 * | 9/2014 | Umans | B62B 1/12 414/800 |
| 2015/0208780 | A1 * | 7/2015 | Avery | B62B 1/125 280/652 |
| 2016/0113388 | A1 | 4/2016 | Distefano | |
| 2016/0257327 | A1 * | 9/2016 | Gayk, Jr. | B62B 1/12 |
| 2020/0189637 | A1 * | 6/2020 | Karlsson | B62B 5/0495 |

FOREIGN PATENT DOCUMENTS

| | | | | |
|---|---|---|---|---|
| FR | 2815595 | A1 * | 4/2002 | A45C 13/002 |
| FR | 2881710 | A1 * | 8/2006 | A45C 13/385 |
| GB | 2053102 | A * | 2/1981 | A45C 13/38 |
| GB | 2421713 | A * | 7/2006 | A45C 13/385 |
| GB | 2446789 | A * | 8/2008 | A45C 13/385 |
| KR | 101635930 | B1 * | 4/2016 | |
| KR | 101635930 | B1 | 7/2016 | |

OTHER PUBLICATIONS

Written Opinion of the ISA dated Mar. 27, 2019, 15 pages.
International Preliminary Report on Patentability dated May 19, 2020 in International Application No. PCT/US2018/061651, 16 pages.

* cited by examiner

MODULAR LUGGAGE SYSTEM

CROSS REFERENCE TO RELATED APPLICATION

This application is a national stage application under 35 U.S.C. 371 of PCT Application No. PCT/US2018/061651 having an international filing date of Nov. 16, 2018, which designated the United States, which PCT application claimed the benefit of U.S. Application Ser. No. 62/587,134, filed Nov. 16, 2017, both of which are incorporated by reference in their entirety.

TECHNICAL FIELD

The invention is related to an improved modular luggage system having an adaptable and/or collapsible cart.

BACKGROUND OF THE INVENTION

Extensive travel often requires a traveler to handle their own luggage in walking through airports, hotels, or other various assembling and marshalling areas. The luggage is usually heavy when fully loaded and therefore, a traveler often uses a dolly truck, bell-hop, or sky-cap to transport the luggage through these assembling and marshalling areas to his or her destination. These methods of transporting the luggage, however, are sometimes impractical, difficult, expensive, or burdensome to the traveler.

To solve this luggage transporting problem, wheels and retractable handles have been added to luggage to enable the traveler to easily transport the luggage through airports, hotels, and the like. Some examples of early types of wheeled luggage may be seen in U.S. Pat. No. 2,925,283 by Stilger entitled, "Luggage On Wheels," U.S. Pat. No. 28,757 by Cassimally entitled, "Trolley Case," and U.S. Pat. No. 29,036 by Hager entitled, "Luggage Transport Structure." Some types of wheeled luggage, such as seen in U.S. Pat. No. 4,087,102 by Sprague entitled, "Hand Carryable Travel Container Convertible to Rollable Cart" and U.S. Pat. No. 4,314,624 by Royet entitled, "Wheel-Mounted Luggage," have added retractable wheels to enhance the portability of the luggage. Others have attempted to strengthen the pulling or handle mechanism as seen in U.S. Pat. No. 5,048,649 by Carpenter et al. entitled, "Luggage with Pull Handle." Still others have applied the wheels and handle directly to garment bags to improve their portability, as seen in U.S. Pat. No. 4,406,353 by Walker entitled, "Wheeled Garment Bag" and U.S. Pat. No. 4,538,709 by Williams et al. entitled, "Wheeled Garment Bag."

Some of the recent popularity of wheeled luggage has developed from the ever-increasing necessity of airline travel. A frequent problem that particularly occurs in airline travel, however, is that the Federal Aviation Administration ("FAA"), for example, has guidelines that only allow a passenger a limited number of carry-on bags into a passenger compartment of an airplane when boarding. A traveler, however, often would like to have multiple pieces of luggage, including pieces such as wheeled luggage for traveling through airports, a garment bag for suits or dresses, a briefcase, a portable computer, or additional luggage which does not require checking, loading, and transporting the luggage by the airline itself. Also, the traveler often is faced with the decision of packing more belongings (i.e., clothing, files, etc.) than they can physically carry, versus making sure they have all the belongings that may be needed for inclement weather, business situations, or the like arise during travel. If three or more pieces of luggage are needed, the traveler must check at least one of the pieces with the airline. This requirement of checking luggage with the airline itself may slow eventual departure from the airport as the traveler waits to disembark from the passenger compartment and also waits for the luggage to be unloaded by airline personnel, may cause the traveler to be late for or miss scheduled meetings, and entrusts the luggage with a third party (i.e., airline personnel) which entails risk of damage or lost items.

Additionally, the pieces of luggage that the traveler chooses to carry into the passenger compartment must be sized to fit either beneath the passenger's seat or in the overhead storage area above the passenger's seat on the airplane. If the luggage pieces are too large or if the traveler wants to pack additional items in the luggage, he once again must check luggage through the airline. Further, the traveler may also experience problems with transporting the additional luggage through various marshalling areas and the like.

As such, there exists a need for an improved modular luggage system that addresses the problems identified above. This modular luggage system must be both practical and cost effective and be compatible with various types of travel arrangements from quick overnight trips to extended business related travel.

BRIEF SUMMARY OF THE INVENTION

One aspect of the current invention may be to provide a modular luggage system having an adjustable cart and at least one modular bag that may be configured to be secured to the adjustable cart through one or more coupler components. In this embodiment, the adjustable cart may further include a plurality of telescoping arms coupled to a base support as well as a plurality of extendable wheels secured to the base support through at least one wheel coupler. A plurality of coupler positions may be configured to be coupled with at least one adjustable support surface through at least one adjustable support coupler. The adjustable support surface may be expandable through the use of one or more collapsible extensions such that it may better accommodate one or more modular bags.

Another aspect of the current invention may be to provide an adjustable cart configured to be fully-collapsible. In this embodiment, the collapsible adjustable cart may be configured in a nested configuration such that it may be a unibody structure that may be easily collapsed and stored, preferably in one or more modular bags.

Another aspect of the invention may be to provide a belt-mounted stair guide mechanism to assist a user maneuver an adjustable cart up stairs, or other irregular elevated surfaces. Naturally, many other explicit and implicit embodiments of the invention are further outlined in the specification, claims, and figures generally disclosed herein.

Another aspect of the current invention may be to provide a nested adjustable cart. In this embodiment, it may include a plurality of collapsible extensions that may be coupled with one or more telescoping arms and may further be configured in a nested formation such that when the adjustable cart is placed in its collapsed position the collapsible extensions may be positioned in a tight overlapping nest formation to reduce the overall size and bulk of the adjustable cart in its collapsed configuration.

Another aspect of the current invention may further include an improved system for securing one or more modular bag to an adjustable cart. In this embodiment, one or more extensions may couple with an adjustable cart and may correspond to one or more reinforced slots on a modular bag. In this embodiment, the corresponding extension(s) and slot(s) may form a tongue and groove coupling which may help secure the modular bag to the adjustable cart.

Another aspect of the current invention may be to provide a modular computer case configured to be coupled with an adjustable cart through at least one adjustable case coupler.

Another aspect of the current invention may be to provide a modular bag having an expandable frame. This expandable modular bag may have an expandable frame and an extendable portion operably linked to an expansion lock and an expansion mechanism.

Another aspect of the current invention may be to provide a detachable modular case that may securely hold valuables, such as jewelry, cash, or important documents and the like. This secure compartment may be positioned in a nested or hidden compartment and further be secured to a modular bag or frame. This secure compartment may further be configured to be removed such that it may be stowed on a traveler's person or as a separate carry-on piece.

Another aspect of the current invention may be to provide a modular bag having a water-tight internal lining as well a drain port to allow the modular bag to be converted into an adaptable mobile cooler.

Additional aspects of the current invention may become evident from the descriptions and figures highlighted below.

BRIEF DESCRIPTION OF THE FIGURES

The accompanying figures, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the figures.

MODE(S) FOR CARRYING OUT THE INVENTION(S)

Figure 1A:
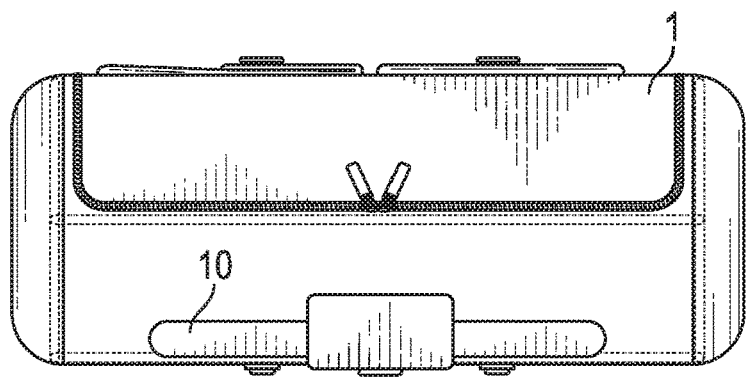
FIG. 1A-G—is an expandable modular bag in one embodiment thereof.
Figure 1B:
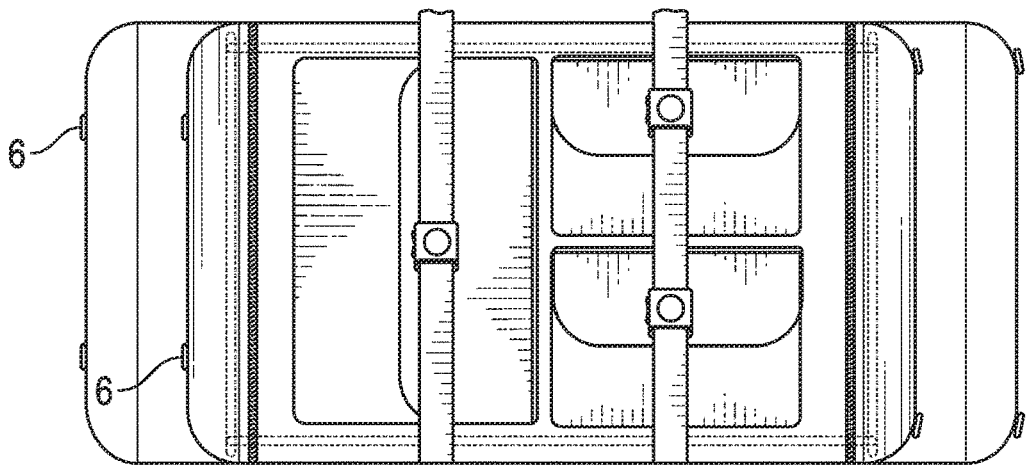
Figure 1C:
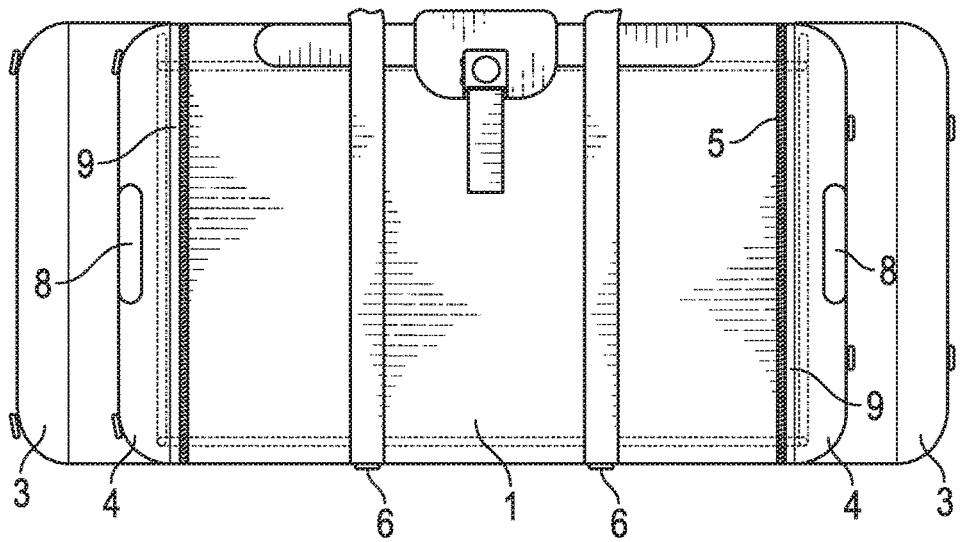
Figure 1D:
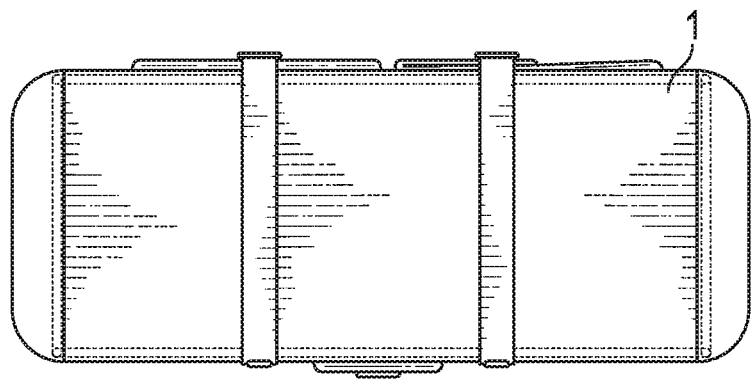
Figure 1E:
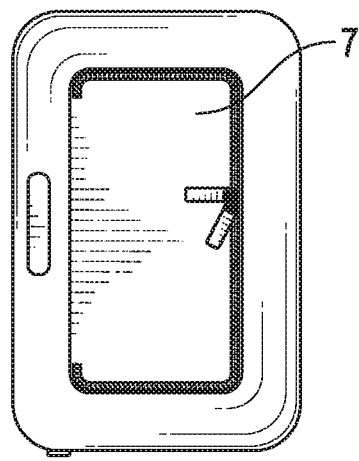
Figure 1F:
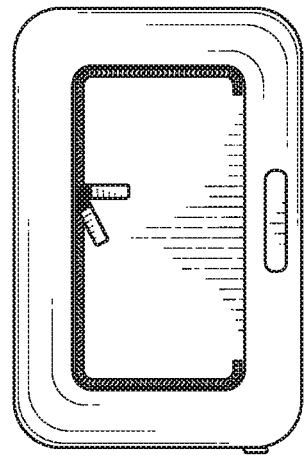
Figure 1G:
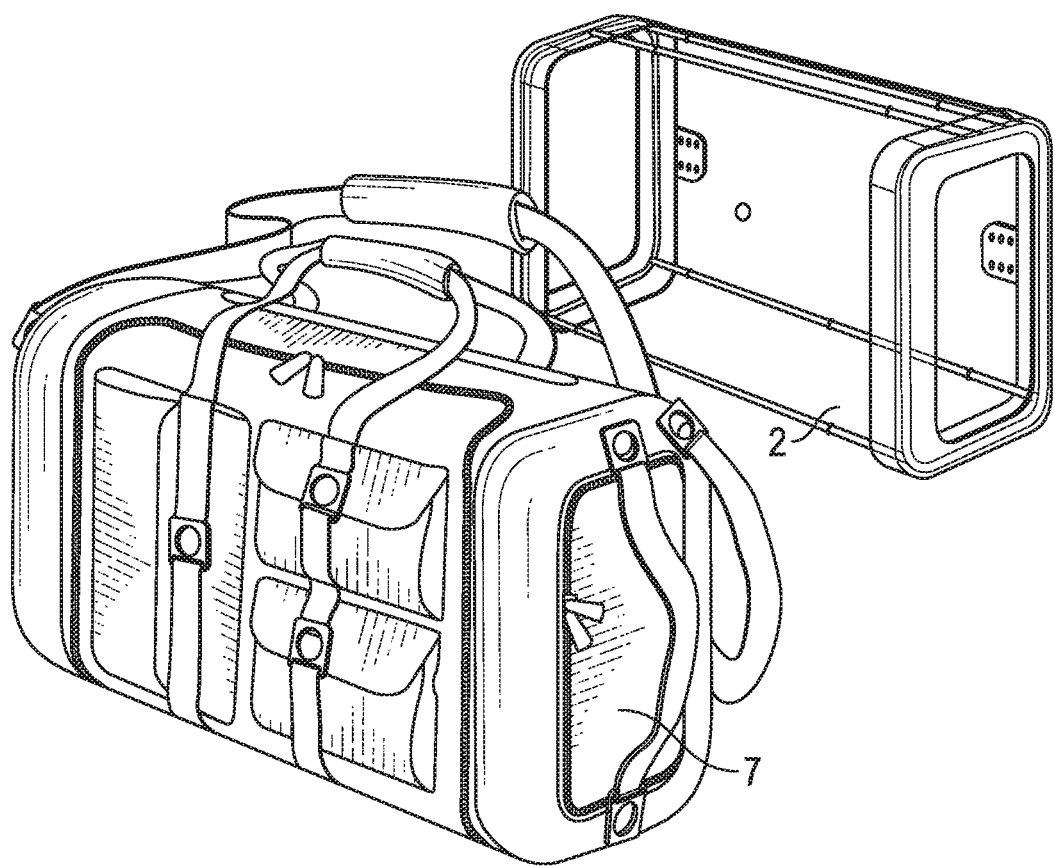
Figure 2A:
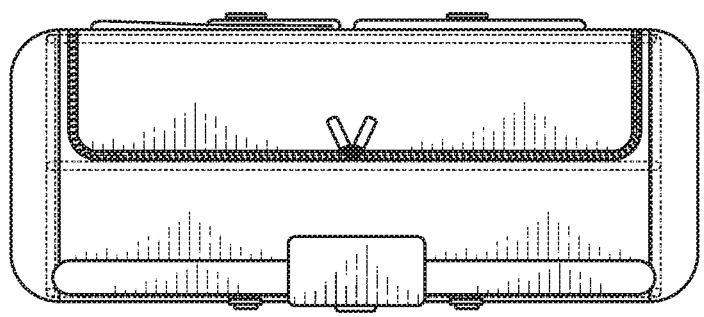
FIG. 2A-F—an expandable modular bag having a secondary removable bag in one embodiment thereof.
Figure 2B:
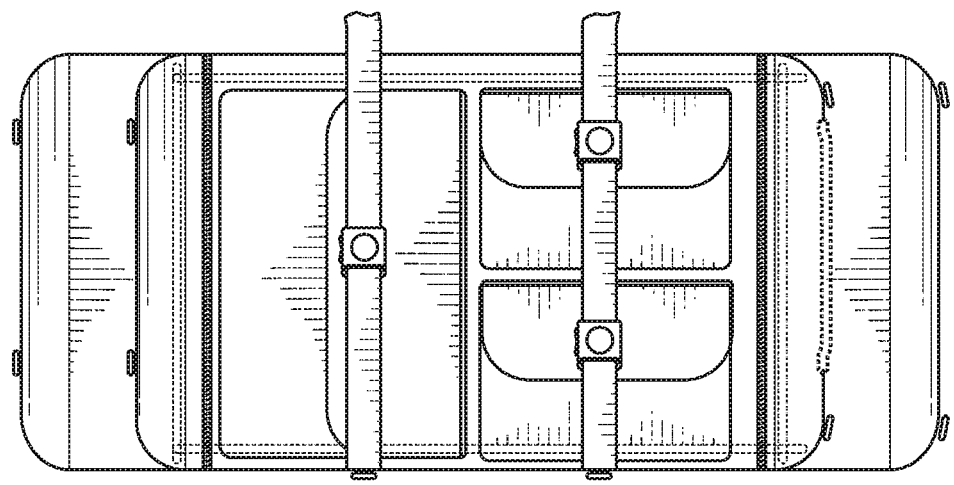
Figure 2C:
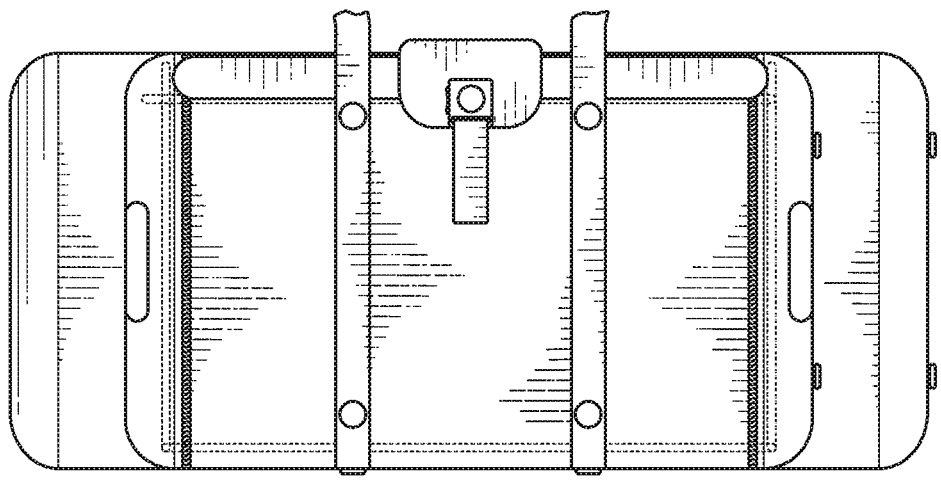
Figure 2D:
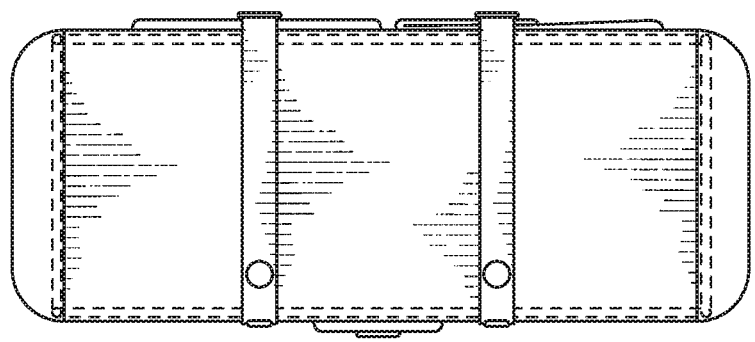
Figure 2E:
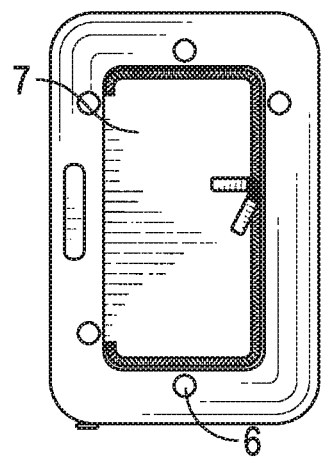
Figure 2E:
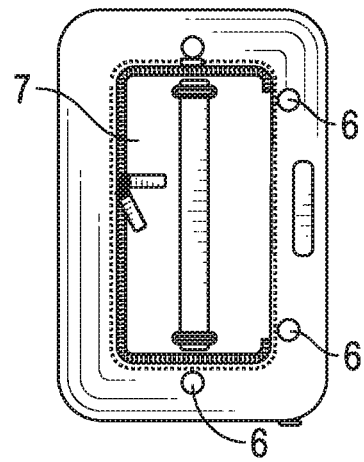
Figure 2F:
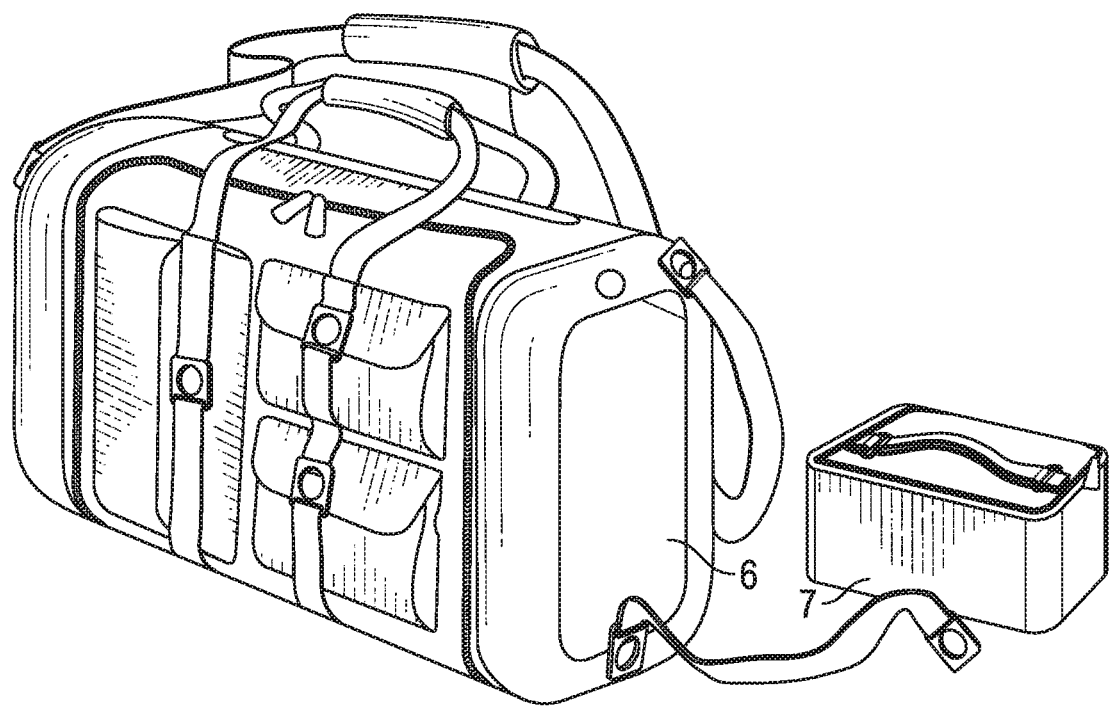
Figure 3A:
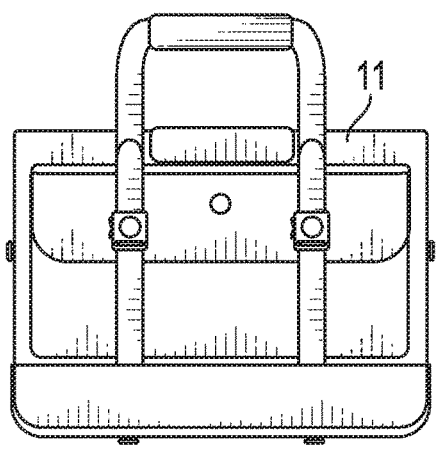
FIG. 3A-G—is an external modular bag and modular computer case in one embodiment thereof.
Figure 3B:
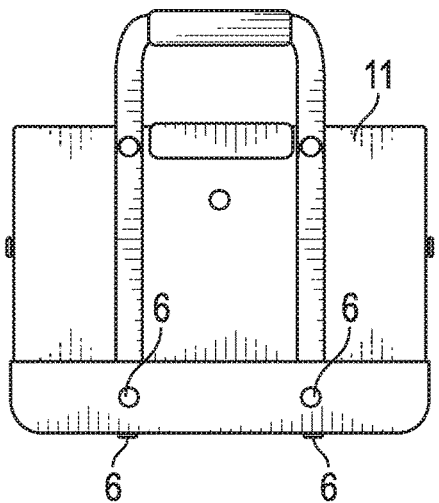
Figure 3C:
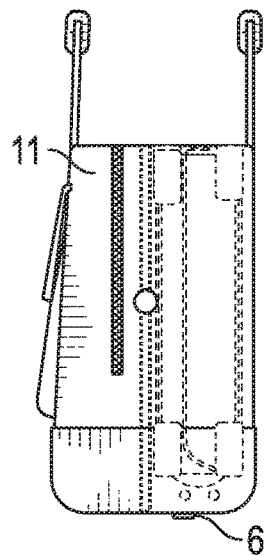
Figure 3D:
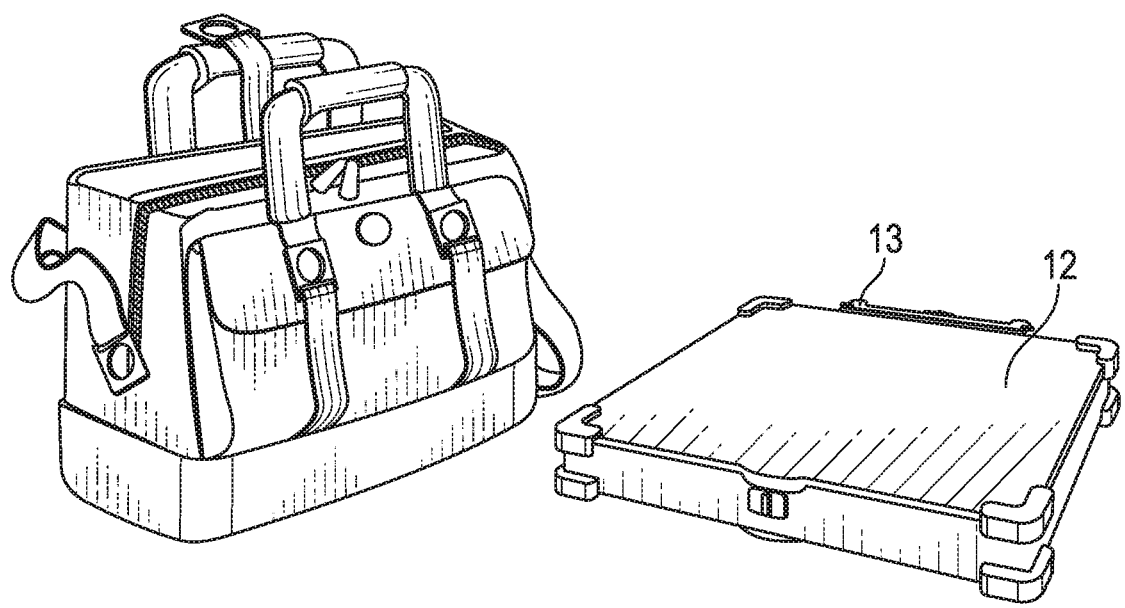
Figure 3E:
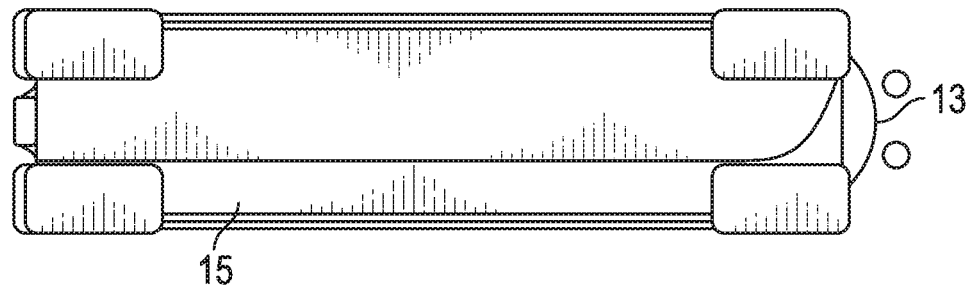
Figure 3F:
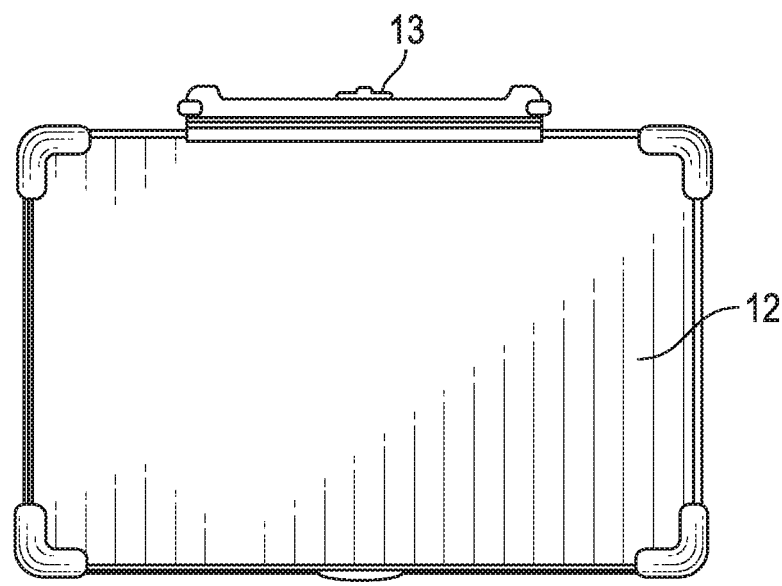
Figure 3G:
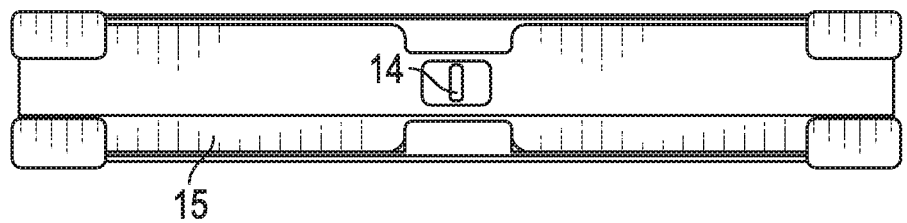
Figure 4A:
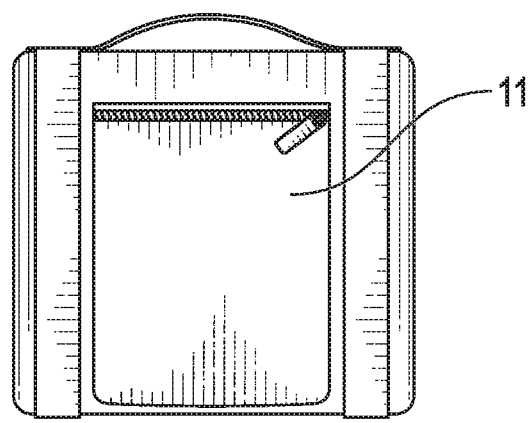
FIG. 4A-E—is an external modular bag and modular computer case in one embodiment thereof.
Figure 4B:
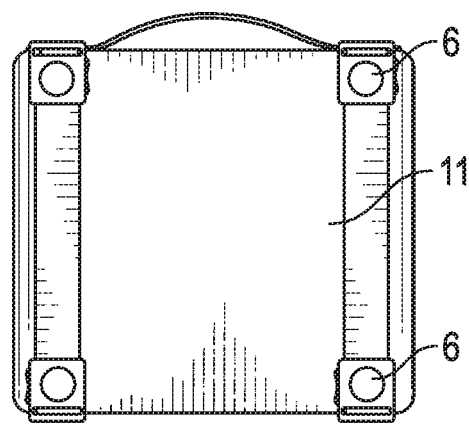
Figure 4C:
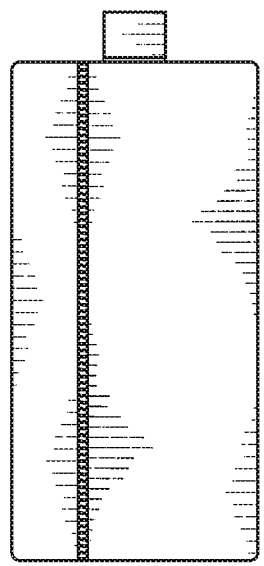
Figure 4D:
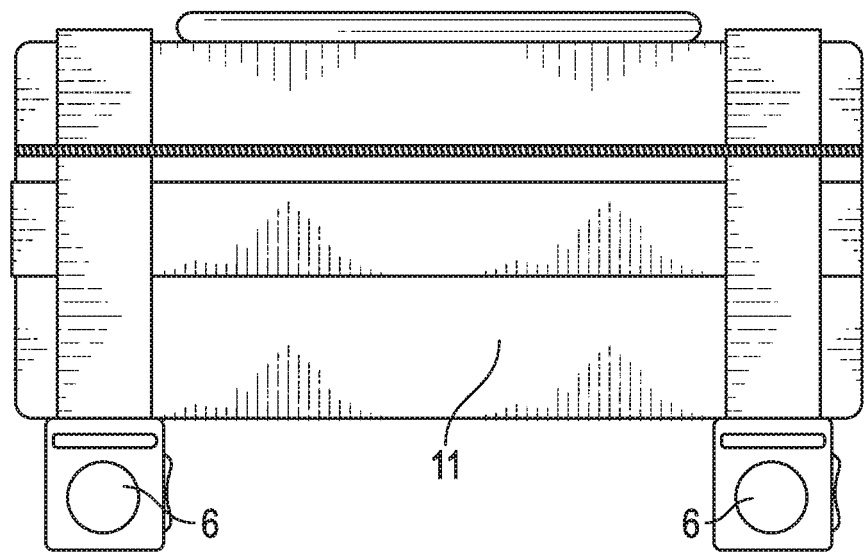
Figure 4E:
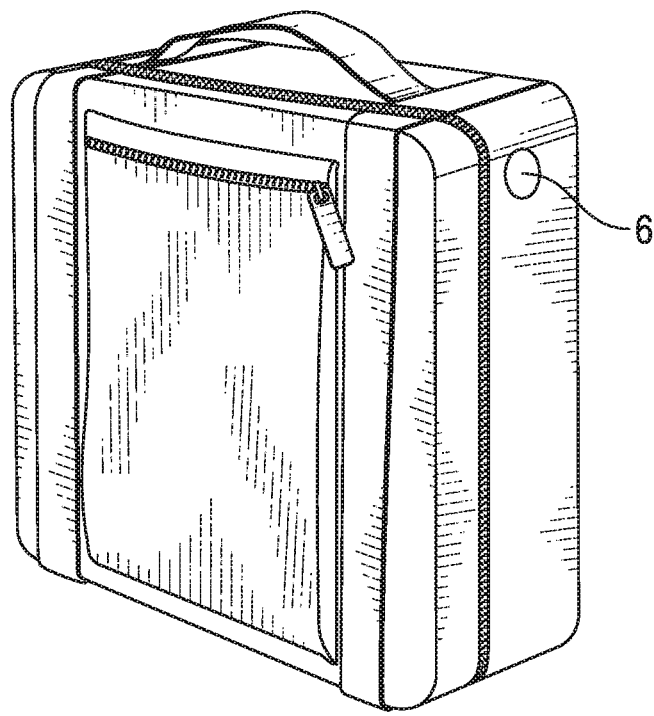
Figure 5A:
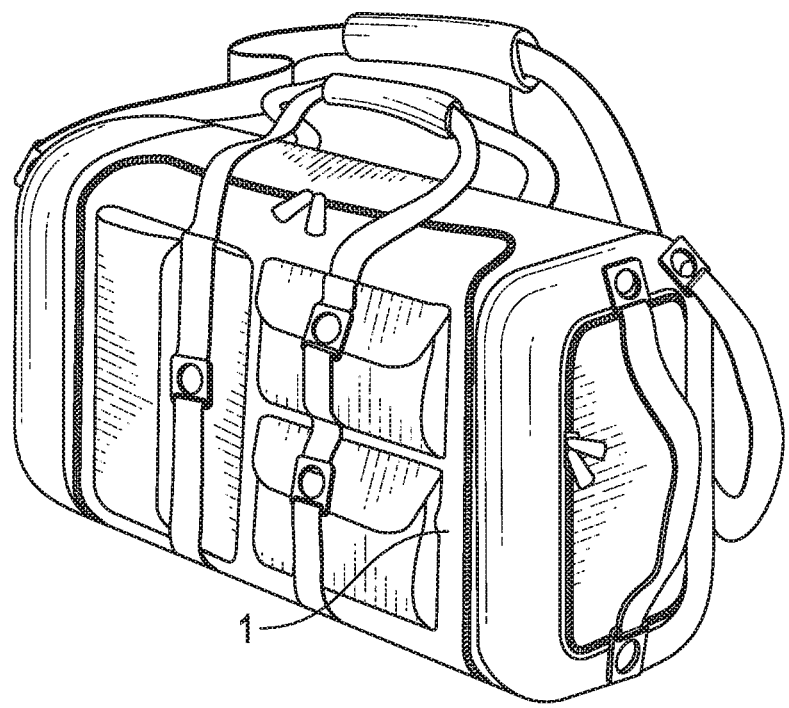
FIG. 5A-E—an expandable modular bag having an internally positioned secondary removable bag in one embodiment thereof.
Figure 5B:
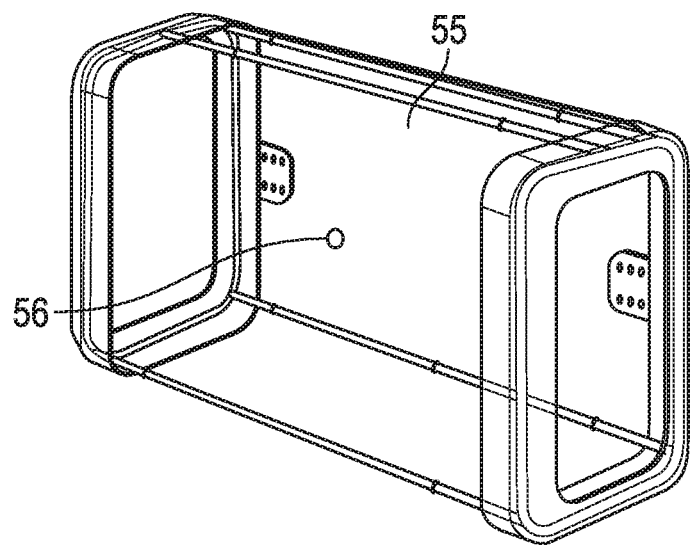
Figure 5C:
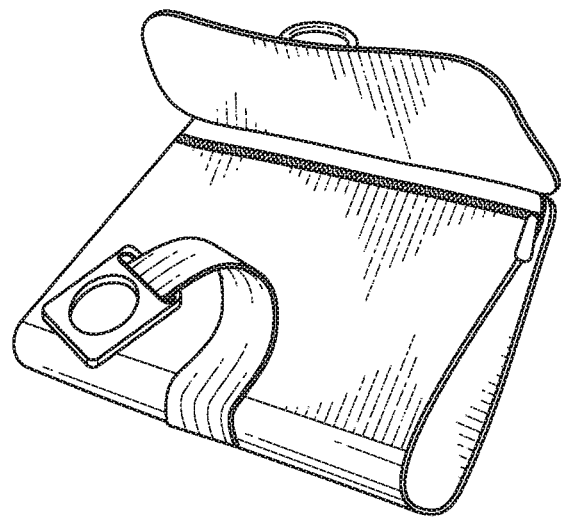
Figure 5D:
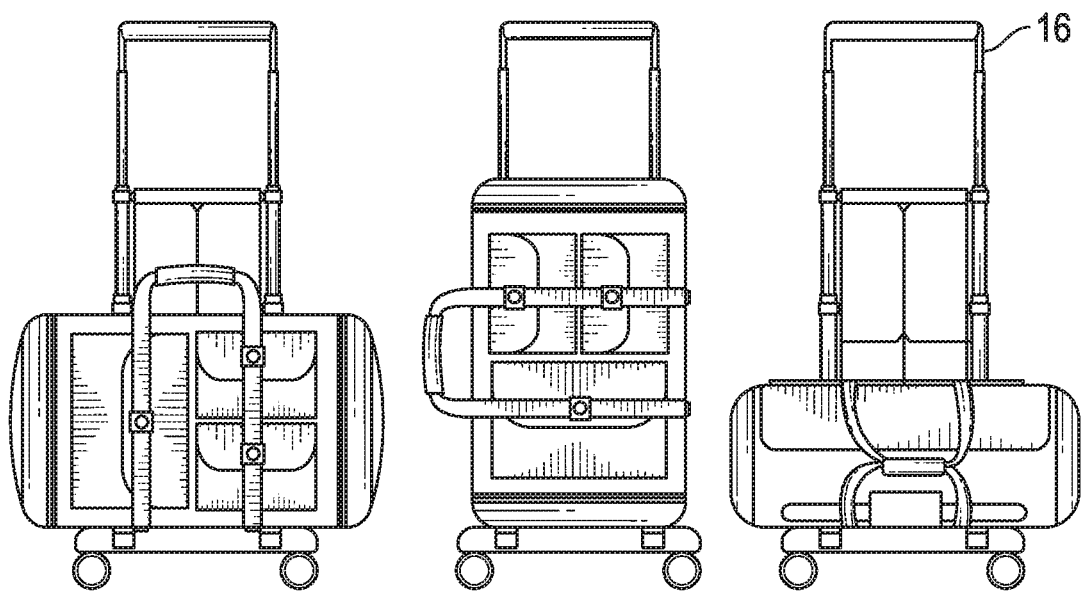
Figure 5E:
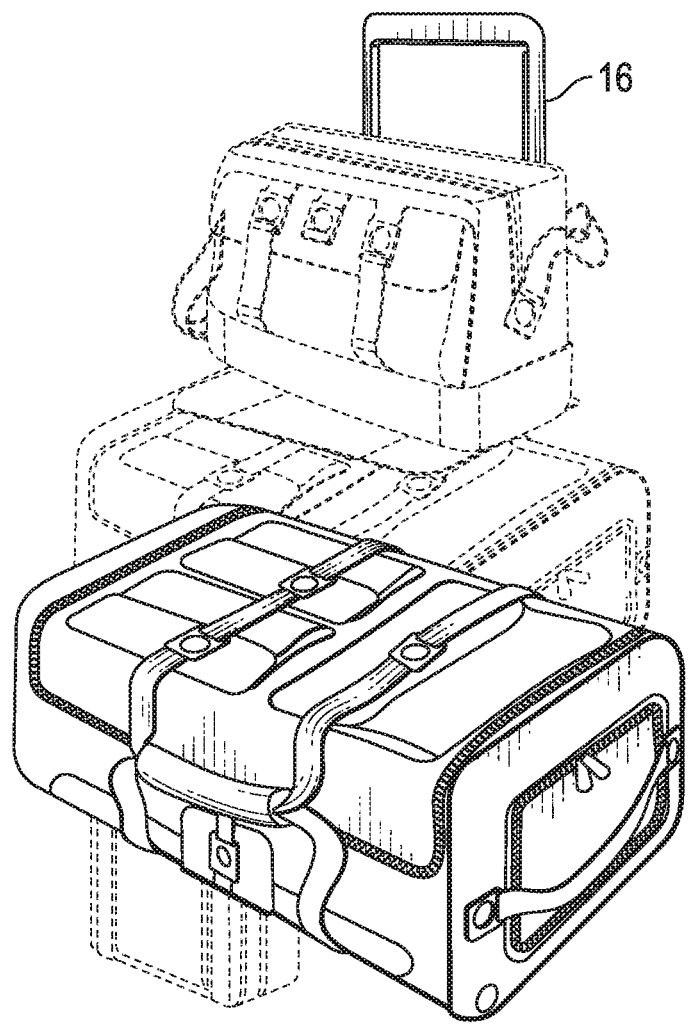
Figure 6A:
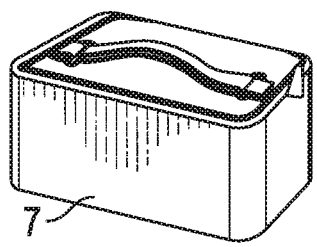
FIG. 6A-F—is an expandable modular bag in and adjustable cart having a separately removed secondary removable bag in one embodiment thereof.
Figure 6B:
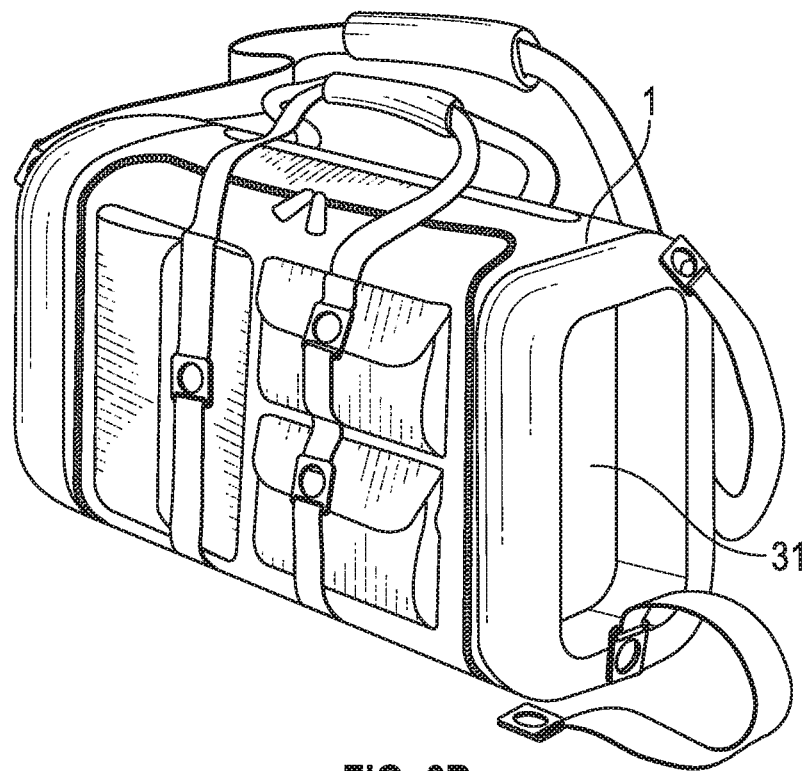
Figure 6C:
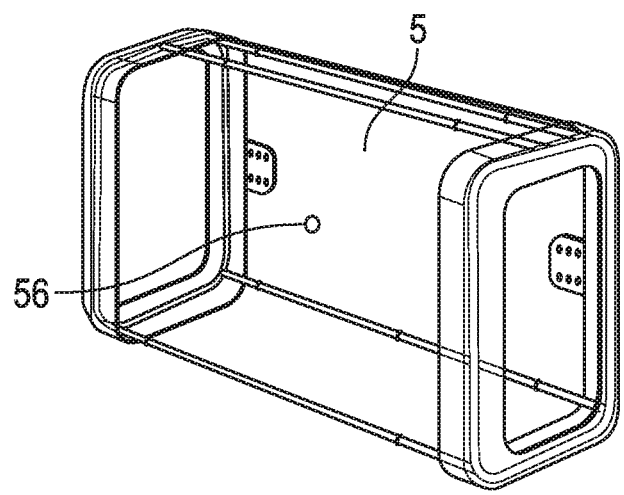
Figure 6D:
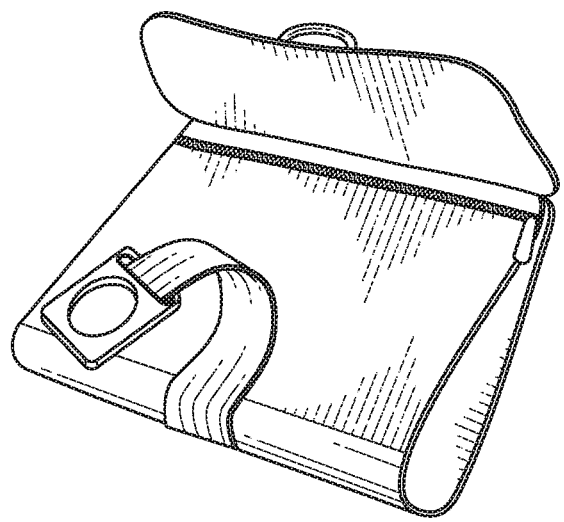
Figure 6E:
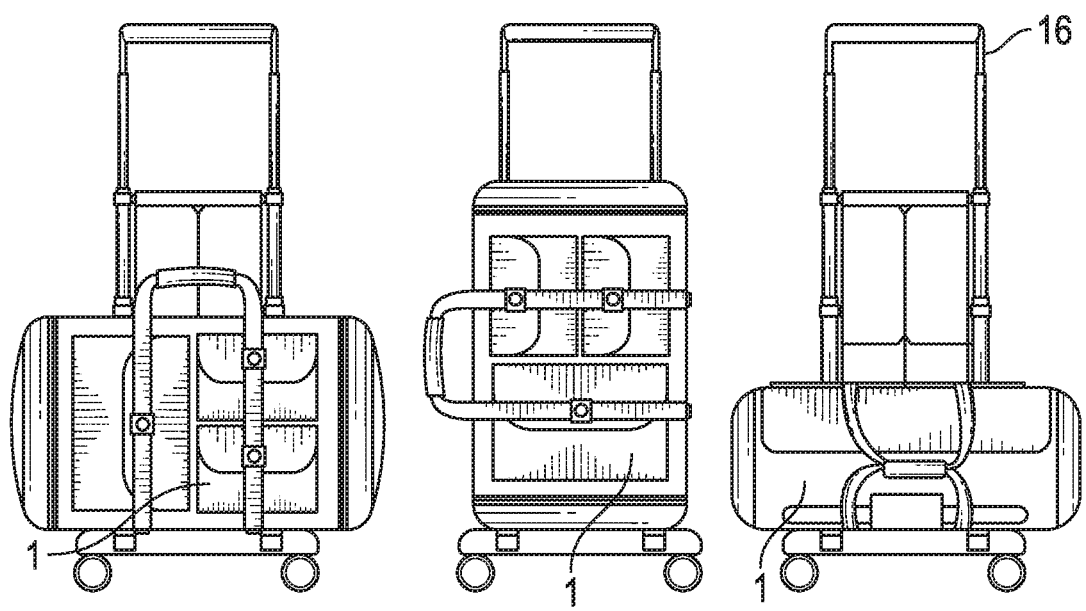
Figure 6F:
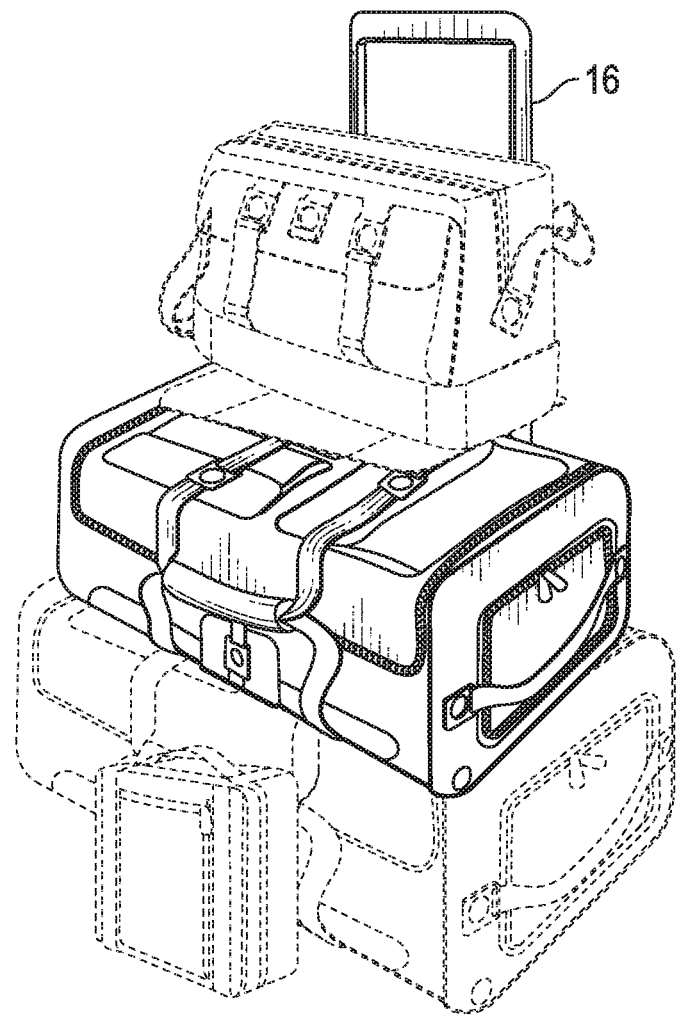
Figure 7A:
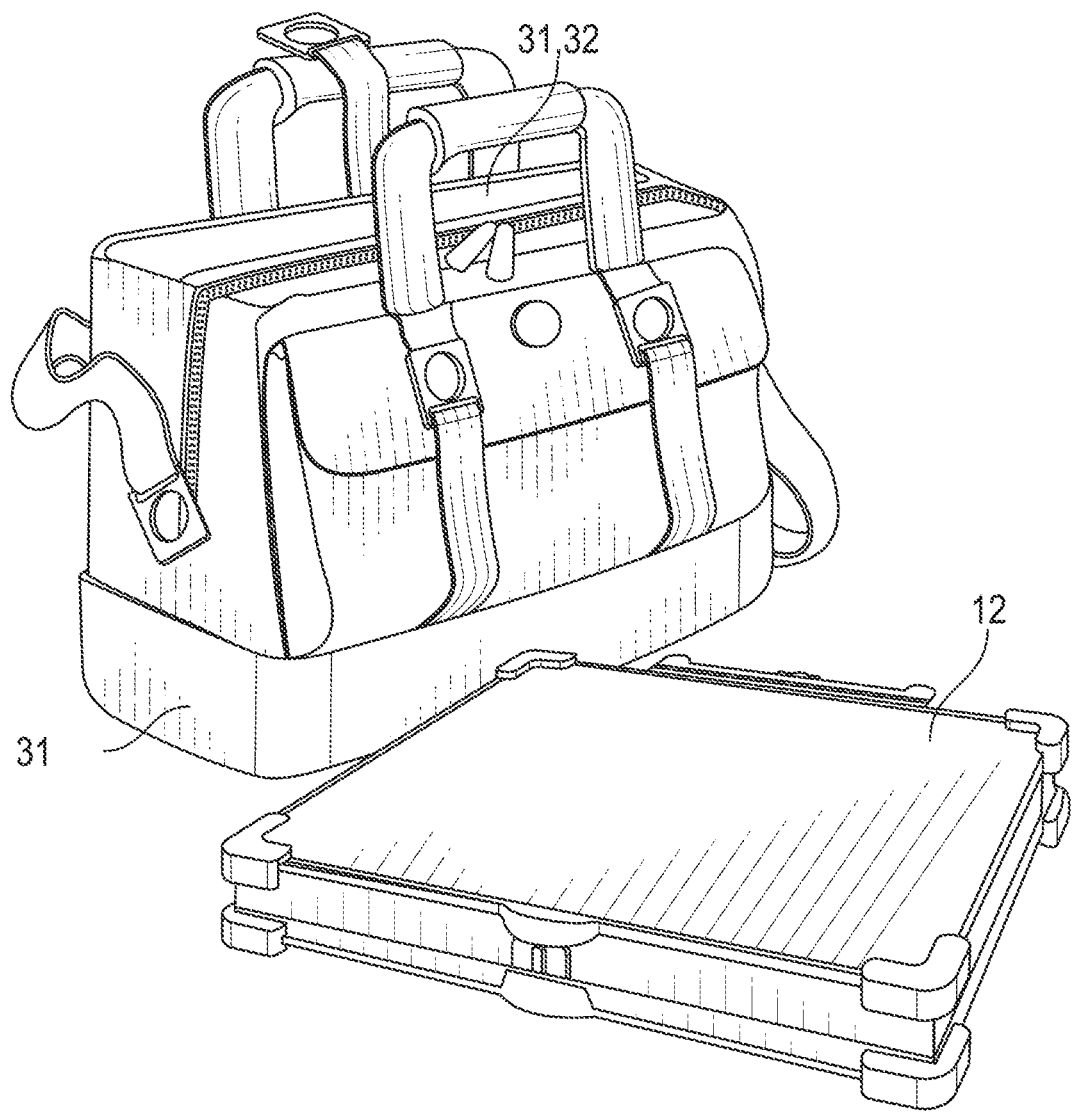
FIG. 7A-E—is a modular bag and computer case in one embodiment thereof.
Figure 7B:
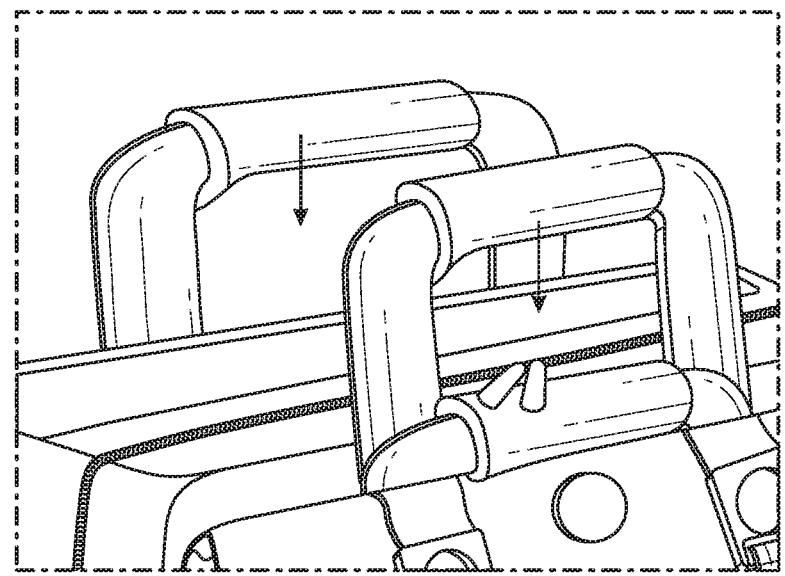
Figure 7C:
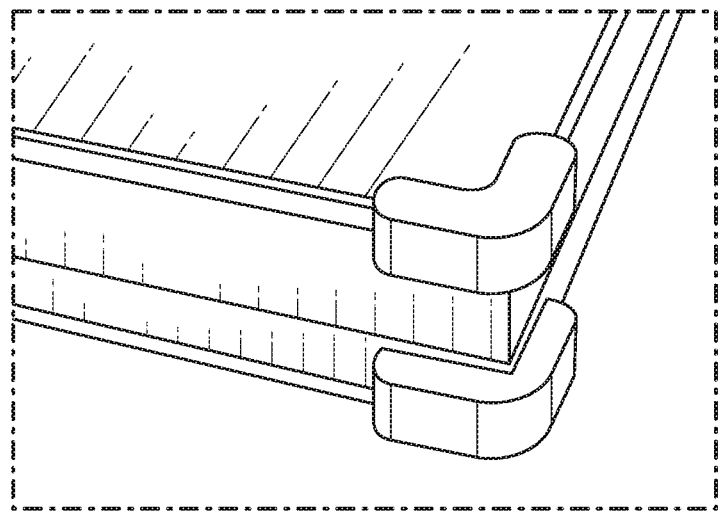
Figure 7D:
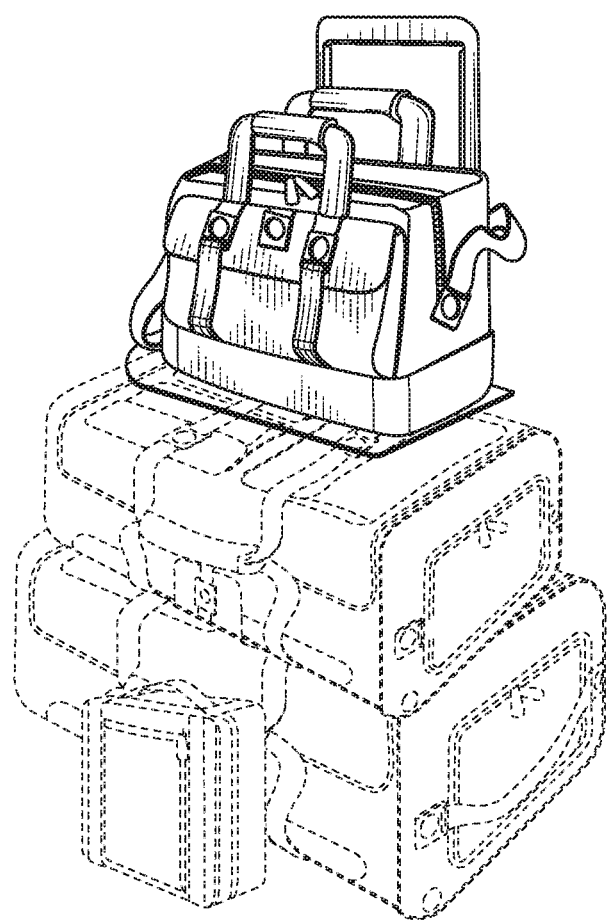
Figure 7E:
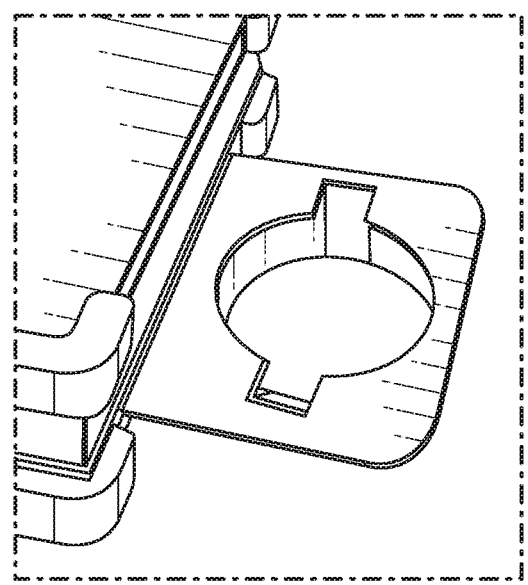
Figure 8A:
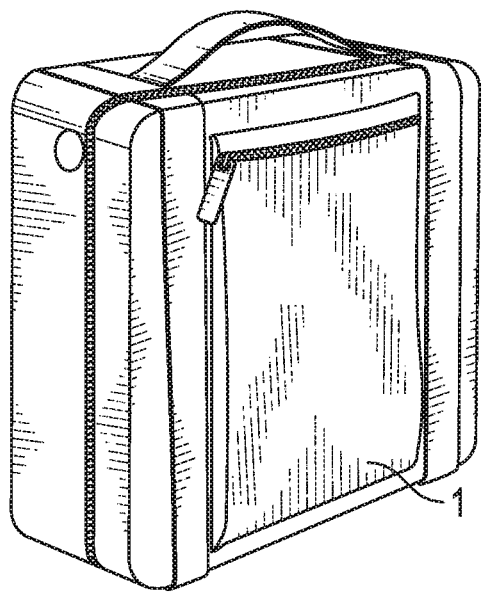
FIG. 8A-D—is a modular bag in one embodiment thereof.
Figure 8B:
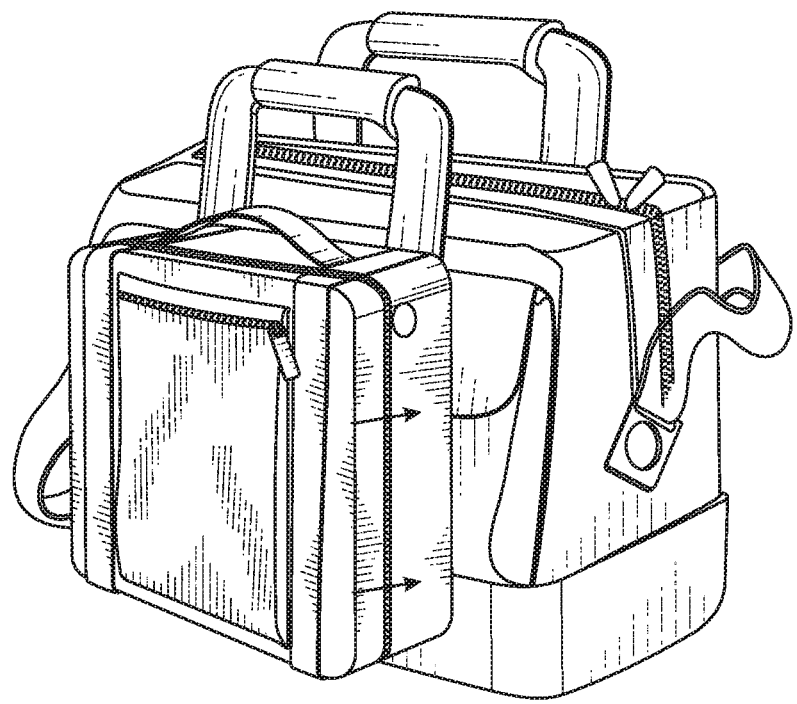
Figure 8C:
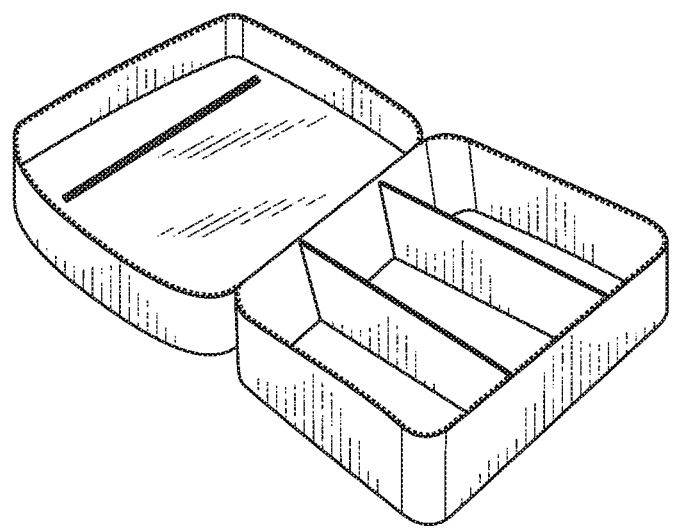
Figure 8D:
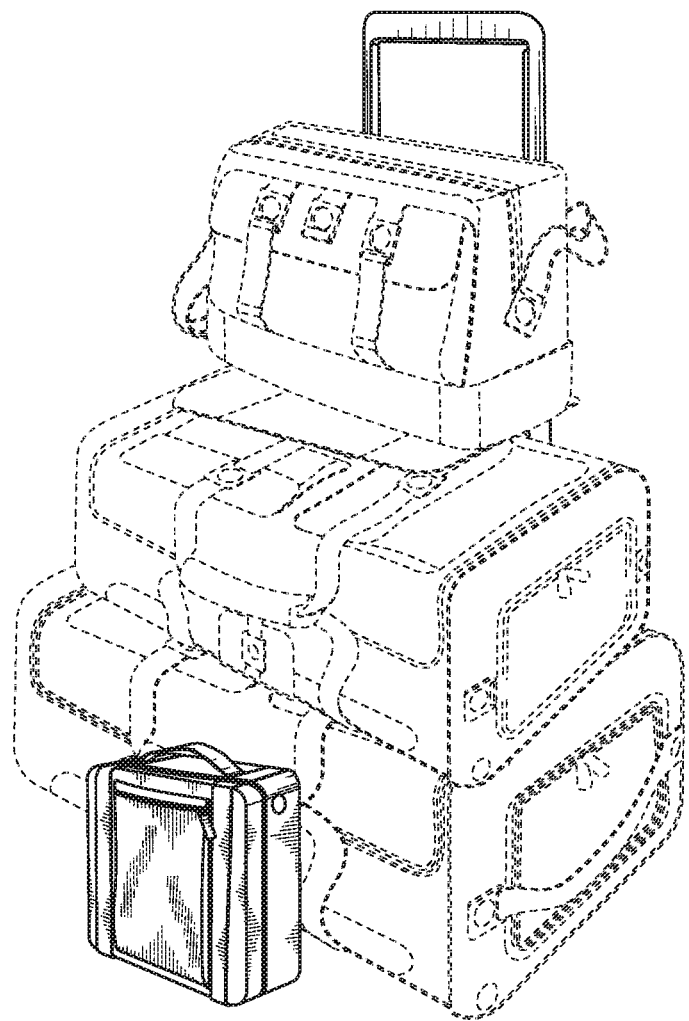
Figure 9A:
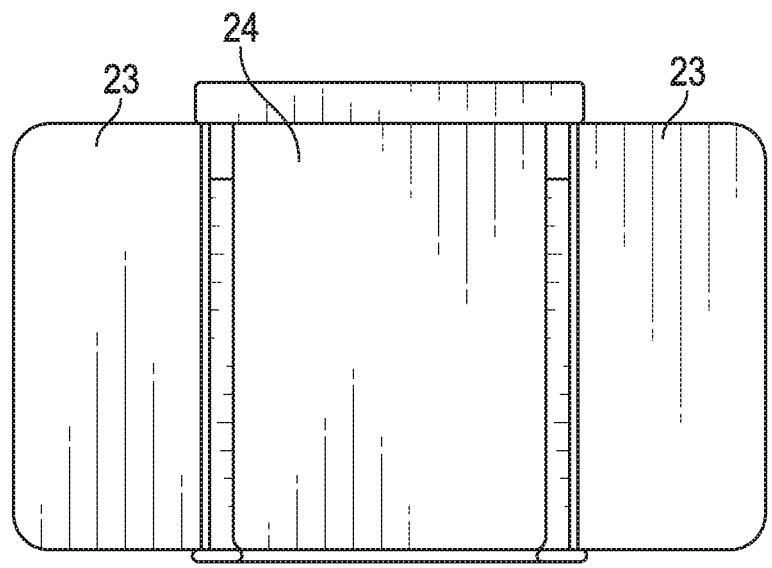
FIG. 9A-I—is an adjustable cart in both extended and collapsed configurations in one embodiment thereof.
Figure 9B:
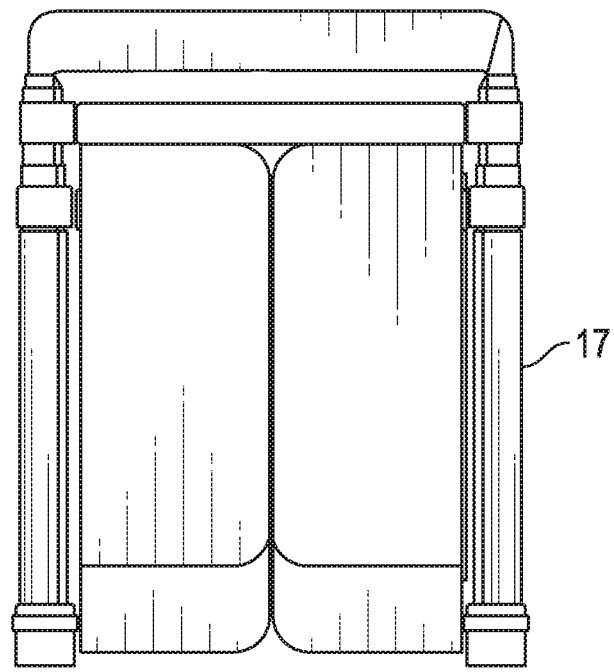
Figure 9C:
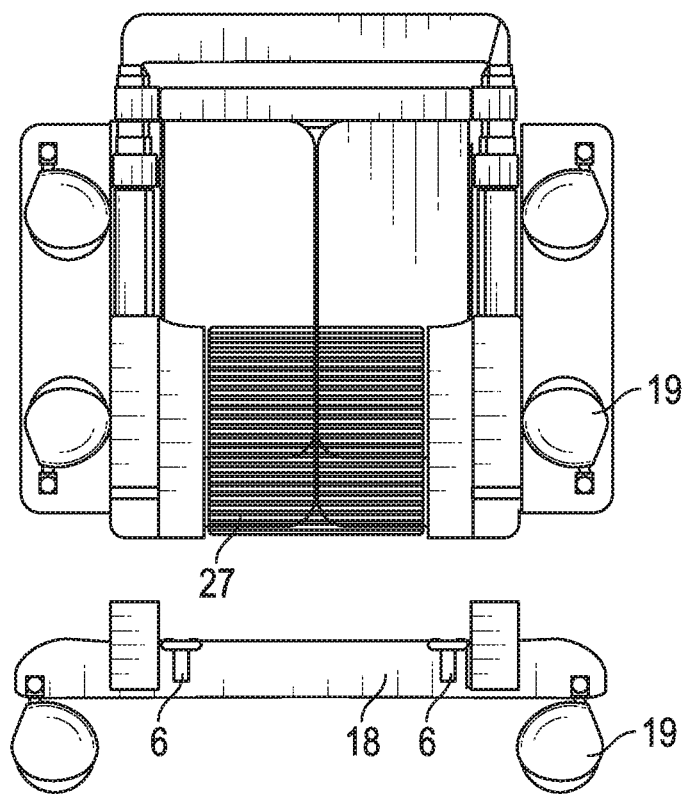
Figure 9D:
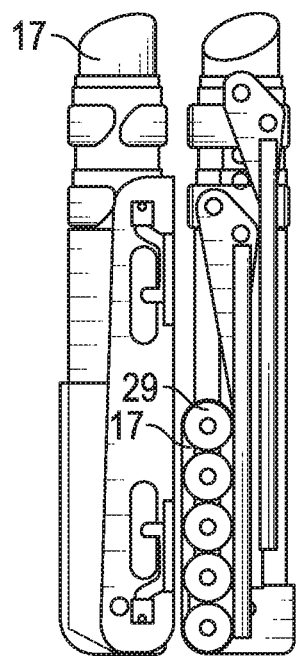
Figure 9E:
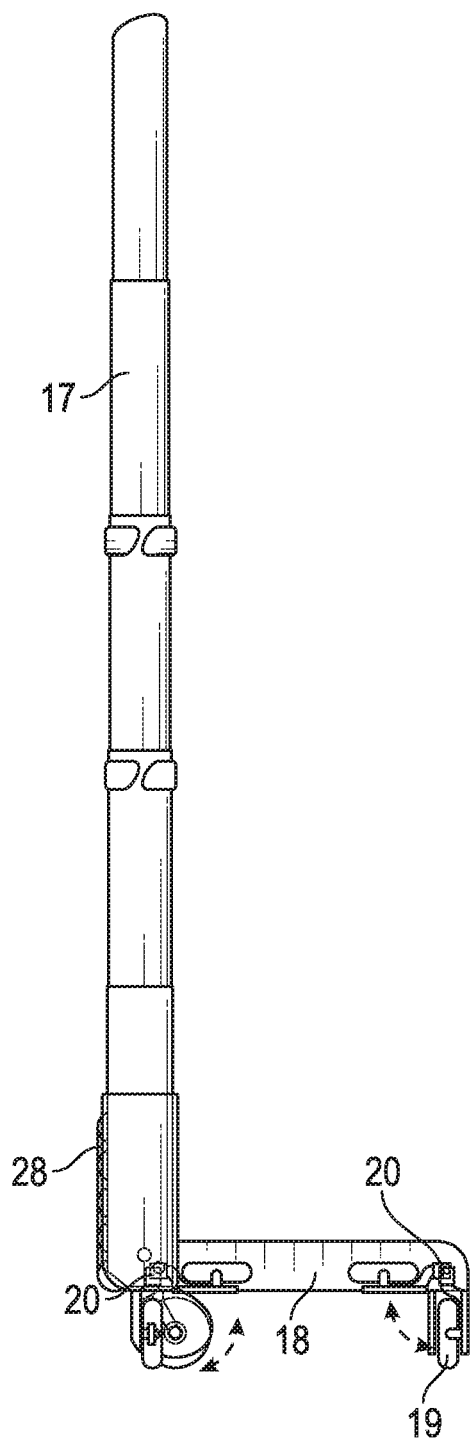
Figure 9F:
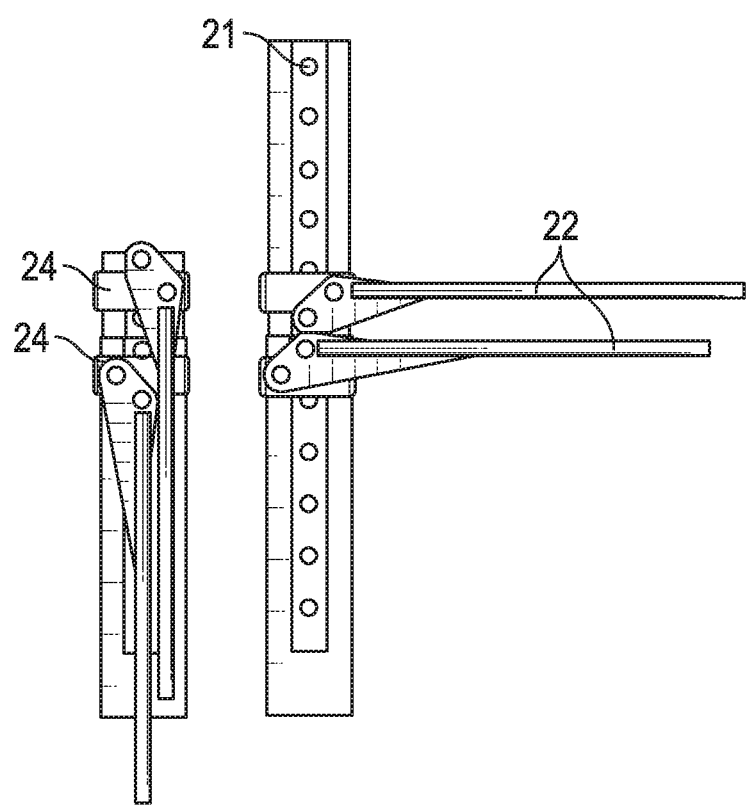
Figure 9G:
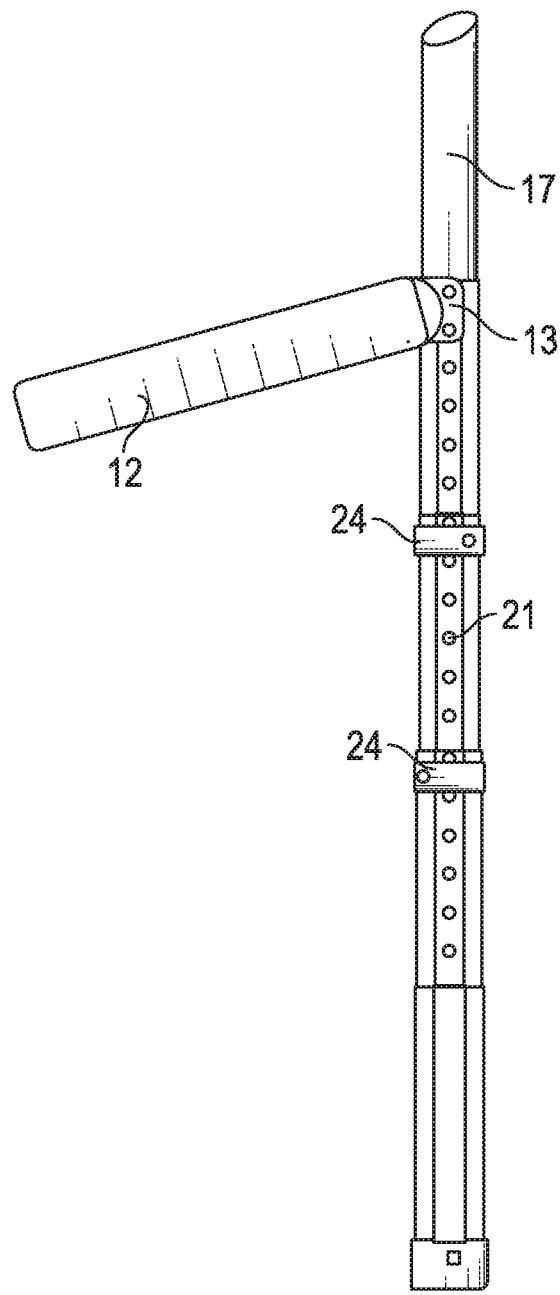
Figure 9H:
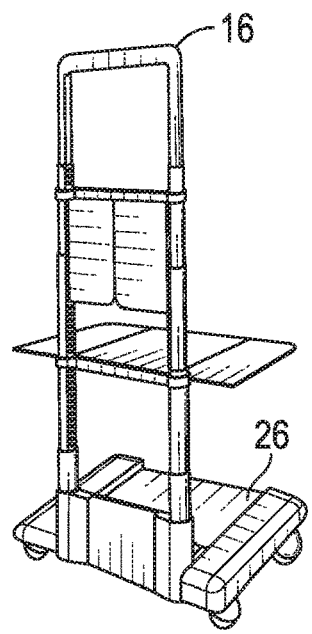
Figure 9I:
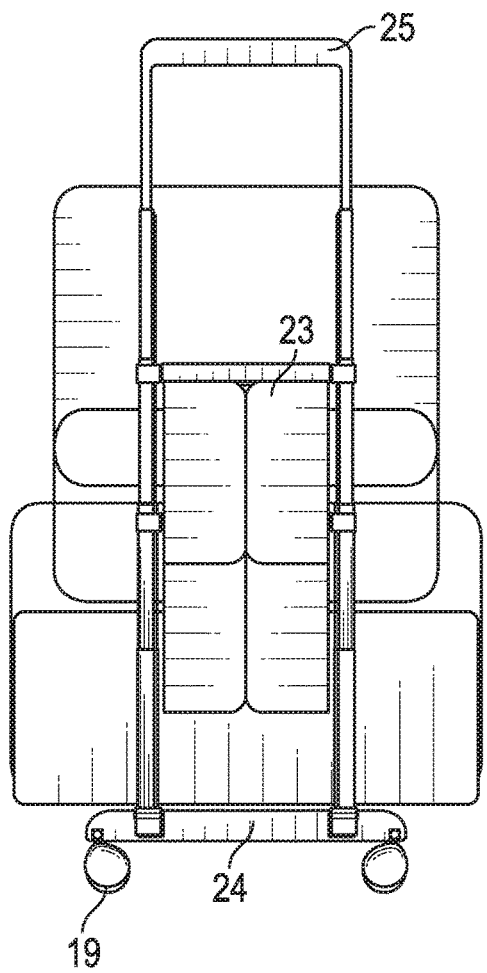

The present invention includes a variety of aspects, which may be combined in different ways to generally describe the novel modular luggage system. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In one embodiment, the invention may include one or more modular bags (1). In the preferred embodiment shown in FIG. 1, a modular bag (1) may include an expandable frame (2). In this embodiment, an expandable frame (2) may be configured to be positioned internally within the modular bag (1) providing a rigid or semi-rigid frame to support the bag's outer shell material. In this embodiment, a plurality of telescoping or extendable frame supports may be positioned internally within the bag, and further coupled to a support frame that may be positioned at either end of the modular bag (1).

In this embodiment, the expandable frame (2) may be coupled to the modular bag (1), for example, through an extendable cap (4). In one preferred embodiment, the expandable frame (2) may be held in a first position by an expansion mechanism (9) and may further be held in this position through the action of an expansion lock (8). Engagement of an expansion lock (8) may disengage the expandable frame from the expansion mechanism (9) and allow the expandable frame (2) to extend outward. The expandable frame (2) may be coupled to one or more extendable caps (4), which may be formed of a rigid material, such as a carbon fiber or other sufficiently rigid materials. The extendable caps (4) may include one or more material channels (5) positioned around their circumference. These material channels (5) may allow an excess of material, generally referred to as the extendable portion (3), to be stored prior to expansion. In this configuration, the extendable portion (3) of the modular bag (1) may not intrude into the inner portion of the bag's interior, but may be extended when the bag and frame are in an extended position. In this embodiment, the expansion lock (8) and/or expansion mechanism (9) may be engaged, securing the frame in an extended position as shown in FIG. 1.

In yet another embodiment, the current invention may include one or more modular secure compartments (31). In one embodiment, a modular secure compartment (31) may include a detachable modular case (31) that may be configured to hold various sized valuable items, such as jewelry, watches, mobile phones, cash and the like. In a preferred embodiment, a modular secure compartment (31) may be a small removable box that may be configured to be nested or hidden within another modular bag (1), or even a compartment within a modular bag (1). In one preferred embodiment, a modular secure compartment (31) may be configured to be positioned within a hidden compartment located between the pull-out portions of a modular bag (1). In this nested configuration, it may be hidden or camouflaged to appear as a separate component of a modular bag (1), and may further be secured by a lock or other securement device, such as a Velcro strap or the like.

In another preferred embodiment, a user may open this hidden compartment and easily access a detachable modular case (53) positioned inside to insert or remove a variety of valuable objects. This internally hidden modular secure compartment (31) may further include a lock component that may secure the detachable modular case (53) to the modular bag (1), and/or expandable frame (2) such that a user would have to first unlock the a the detachable modular case (53) prior to its removal. In another embodiment shown in FIG. 6, a detachable modular case (53) may be positioned within a hidden modular secure compartment (31), for example, a portion between a top section that may hold a smaller secondary modular bag (11), and the internal compartment of a modular bag (1). Additional embodiments may include a variety of hidden modular secure compartments (31), for example positioned below a smaller secondary internal bag (7), or along an extendable cap (4). In certain embodiments, a secure case (54), such as a lock-box may be configured to hold or secure valuable items such as jewelry, identification or other important papers and the like and may further be inserted into one or more internally hidden modular secure compartment (31). For example, I one preferred embodiment, a secure case (54) may be positioned in a secondary internal bag in internally hidden modular secure compartment (31).

Referring to the embodiment in FIG. 3, the invention may include a modular computer case (12) that may be configured to be coupled to an adjustable cart (16) or fitted within one or more modular bags (1). As shown in the figures, a modular computer case (12) may include an adjustable case coupler (13) that may be secured to an adjustable cart (16). As shown, the adjustable case coupler (13) may be coupled with the telescoping arms (17) on the adjustable cart (16), and may further be adjusted to a desired angle. In this embodiment, the modular computer case (12) may be opened while coupled with the adjustable cart (16). The modular computer case (12) may include a low profile partition (15) that may hold a laptop computer. In this configuration, a user may secure the modular computer case (12) to the adjustable cart (16) and open the case. The top partition may be further secured to the adjustable cart (16), for example, through a lock, latch, magnet, or other coupler. In this configuration, a user may operate the computer positioned in the low profile partition (15) directly without having to remove the computer. The modular computer case (12) may be made of a high-strength material, and may further be insulated sufficiently to protect a computer from a fall of a typical height. Examples of additional reinforced laptop cases that may be coupled with the adjustable cart (16) or fitted within one or more modular bags (1). (Additional examples may be identified in U.S. Application No. 62/760,208, filed Nov. 13, 2018). Moreover, the modular computer case (12) may include a lock (14) such that when secured to the adjustable cart (16), the case may be locked to provide an anti-theft function.

In another embodiment, one or more modular bags (1) may be convertible into an insulated container or cooler having an internal watertight compartment (56). In a preferred embodiment, a modular bags (1) may include an insulated surface (55) situated along the internal surface of a modular bag (1). This insulated surface (55) may form an insulating as well as watertight surface lining the internal cavity of the modular bag (1). In this embodiment, a user may fill the modular bag with ice to form a simple and portable cooler system. In this embodiment, the modular bag may further include a drain port (56) that may be open to allow water to drain from the internal watertight compartment (56) of the modular bag.

In one embodiment the invention may include an adjustable cart lift system. As generally shown in the figures, in one preferred embodiment, an adjustable cart lift system may include a mobile track (27) that may be configured to assist a user lift the adjustable cart up the stairs or other irregular elevated surfaces. In this embodiment, a mobile track (27) may be configured to be positioned over two or more track supports (28), which in turn may be supported by one or more track bearings allowing the mobile track (27) to roll in response to an external force. In this embodiment, for example, a user may position the adjustable cart (16) against an elevated surface, such as a stair. In this position the mobile track (27) may be in contact with the front leading edge of the stair. When a user applies an upward/forward pulling force, which may be typical when trying to lift the adjustable cart (16) up the stairs, the mobile track (16) may be pressed against the leading edge of the stair surface, and may move in relation to the adjustable cart's movement up the stairs, supported by the bearing supported track supports (28). In this manner, the mobile track (27) may provide a sliding surface that may assist a user lift and maneuver the adjustable cart (16) up the stairs or other irregular elevated surface.

In additional embodiments, the mobile track (27) may include a plurality of projections (30) that may catch the surface of, for example, a stair surface, and helping to generate the lift assist as described above. In another embodiment, a mobile track (27) may be configured to proceed only in a single direction. For example, the track supports (28), and bearings (29) may be geared or directionally blocked such that they may only allow the mobile track (27) to roll in a forward direction. In this configuration, if, for some reason, a user stalls while lifting the adjustable cart (16) up a stair or other irregular elevated surface, the mobile track (27) may catch the stair ledge, for example through a projection (30), and then be locked in place by the unidirectional track-supports/bearings (28)(29), supporting the adjustable cart (16) in place until the user re-exerts an upward/forward force to continue maneuvering the cart up the stairs. In a preferred embodiment, the mobile track (27) may be formed of a pliant or semi-pliant material such as a rubber or other composite material that may be sufficiently flexible to allow the rolling assist mechanism as described above, as well as provide sufficient buffer to a user maneuvering an adjustable cart (16) up an irregular elevated surface such as stairs.

In another preferred embodiment, the mobile track (27) may be formed from a material having a high frictional ratio. In this configuration, if, for some reason, a user stalls while lifting the adjustable cart (16) up a stair or other irregular elevated surface, the mobile track (27) may catch the stair ledge and be held there by the friction generated between the stair surface and the mobile track (27), and then be locked in place by the unidirectional track-supports/bearings (28)(29), supporting the adjustable cart (16) in place until the user re-exerts an upward/forward force to continue maneuvering the cart up the stairs.

As generally shown in the figures, the current invention includes an improved modular luggage system. This modular luggage system may include a variety of components that may be positioned in multiple configurations based on a user's desire or need. As generally shown in FIG. 9, in one embodiment the invention may include an adjustable cart (16). In one embodiment, the adjustable cart (16) may include one or more telescoping arms (17). In the preferred embodiment shown, each telescoping arm (17) may include a plurality of telescoping portions that may extend or retract based on, for example, the height of a user. In a certain embodiment, telescoping arms (17) may include a lock, such as a twist, slide, or button lock that may secure the telescoping arms (17) into position, while in alternative embodiments, the telescoping portions may be configured having slightly wider proximal portions, such that they form a compression connection when fully extended. In a certain embodiment, a single arm which may or may not be telescoping may also form an embodiment of the invention.

Referring back to FIG. 10, in one embodiment, one or more telescoping arms (17) may be adjustable coupled with a base support (18). In this embodiment, this base support (18) may be secured to a pair of telescoping arms (17) further coupled by a handle (25). As shown in the figures, the base support (18) may be adjustable coupled with the telescoping arms (17) such that the components are collapsible with one another. In this embodiment, the base support (18) may be coupled to the telescoping arms (17) through an adjustable joint, such as a swivel joint that may allow the base support (18) to swivel upward and be positioned adjacent to the telescoping arms (17). One or more locking mechanisms may be positioned to secure the base support (18) into an extended, semi-extended, retracted, or semi-retracted position. In an alternative embodiment, the base support (18) may include a coupler that may be configured to be secured to one or more of the telescoping arms (17), or other components of the adjustable cart (16) to secure it into an extended, semi-extended, retracted, or semi-retracted position. Such coupler and/or locks may be automatic or manually operated by a user.

Figure 10:
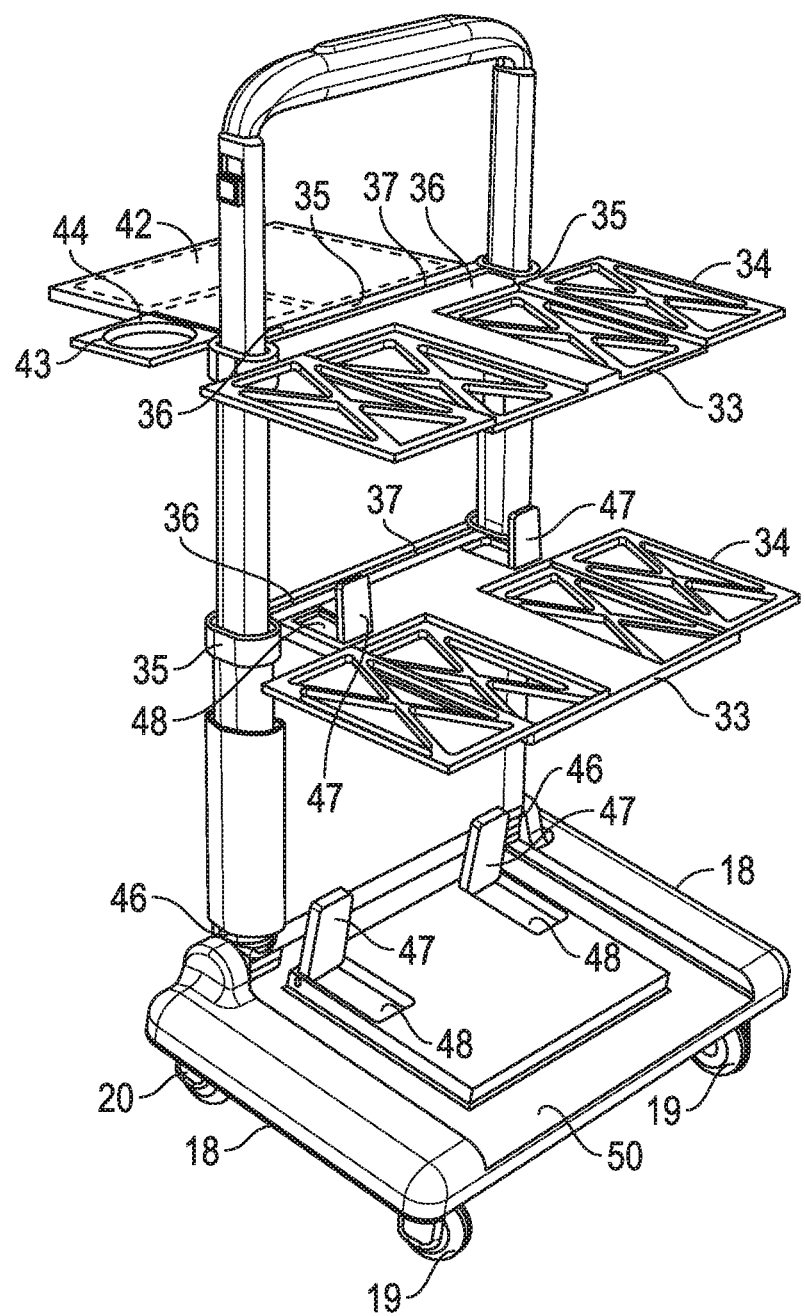
FIG. 10—is modular collapsible cart in a fully extended position in one embodiment thereof.

Referring now to FIG. 10, in one embodiment, a base support (18) may include a plurality of extendable wheels (19). In one embodiment, the plurality of extendable wheels (19) may be coupled with the base support (18) through a wheel coupler (20). In the preferred embodiment shown in the figures, when the base support is configured in its retracted position, the extendable wheels (19), through the action of the wheel coupler (20) may also be configured to be in a retracted position such that they are positioned internally within the base support (19). As the base support is extended, the extendable wheels (19), again through the action of the wheel coupler (20), may also be extended until they reach a fully extendable position. In certain embodiments, extendable wheels (19) may be locked into their fully extended position through the action of the wheel coupler (20), which may include a mechanical coupling, a spring-levered coupling, as well as a hydraulic coupling in certain embodiments. The extendable wheels (19) may be rotatable in 360° degrees and may further include wheel guards to prevent objects from becoming entangled in the wheels.

Again referring to FIG. 10, in one embodiment, the invention may include one or more adjustable support surfaces (22). In the preferred embodiment shown in the figures, an adjustable support surface (22) may include an extended support surface that may be coupled to the adjustable cart (16) and used to support one or more items. In a certain embodiment, an adjustable support surface (22) may include one or more collapsible extensions (23). In this embodiment, one or more collapsible extensions (23) may be coupled with an adjustable support surface (22) through an adjustable joint, such as a hinge joint. When the adjustable support surface (22) is positioned in an extended position, one or more collapsible extensions (23) may further be extended and locked into position to increase the surface area of the adjustable support surface (22). Conversely, the collapsible extensions (23) may be retracted and coupled with the adjustable support surface (22) to facilitate the adjustable cart's collapsible features as detailed below.

In the preferred embodiment, highlighted in FIG. 10, the telescoping arms (17) may include a plurality of coupler positions (21) that may be configured to be coupled with an adjustable support (24) on the adjustable support surfaces (22). In this configuration, one or more adjustable support surfaces (22) may be coupled at customizable positions along the length of the telescoping arms (17). Additionally, such adjustable support (24) may allow adjustable support surfaces (22) to be positioned at a variety of angles with respect to the telescoping arms (17). In a certain embodiment, a coupler position (21) may include a plurality of integral apertures positioned along the length of a telescoping arm that may be configured to be coupled with an adjustable support coupler (24). In an alternative embodiment, coupler positions (21) may include a variety of couplers, which may be integral or non-integral to the adjustable cart (16) that may be configured to be coupled with an adjustable support coupler (24). Examples of such couplers may include slide couplers, clamp couplers, button-lock couplers, hook couplers, magnetic couplers, mechanical locks or connectors, and the like.

As shown specifically in FIG. 10, the adjustable supports (24) may allow adjustable support surfaces (22) to be positioned in a fully retracted position such that it is approximately adjacent to the length of the telescoping arms. Further, the adjustable supports (24) may allow the adjustable support surfaces (22) to be positioned in a nested position such that they are placed approximately adjacent and overlapping to one another. These adjustable configurations may allow the adjustable support surfaces (22) to be collapsed into a compact configuration, for example, when not in use.

In a preferred embodiment, a base support (18) may include a depressed position (26). In this configuration, the base support (18) may include a depression configured to accommodate one or more of the telescoping arms (17) and adjustable support surfaces (22). Such a depressed position (26) may allow the adjustable cart (16) to be positioned into a more fully collapsible, lower profile and compact configuration. In this configuration, the collapsed adjustable cart may be positioned within a modular bag (1) for transport.

In one embodiment the invention may include an improved modular collapsible cart (32) system that may be further configured to secure and transport one or more modular bags. This improved modular collapsible cart (32) system may further be configured to be fully collapsible such that it may be easily stowed in a modular bag (1) or other similar storage device, such as a portable container (52), which may be optimal for shopping or transporting a variety of items.

Referring now to FIGS. 10-23, the modular collapsible cart (32) may include a base support (18) that may generally include a substantially square and/or rectangular planar surface, preferably having a low profile configuration that may be configured to be in close proximity to the ground. The underside of this base support (18) may include a plurality of low profile wheel slots (45), preferably positioned at each corner of the base support (18). As specifically shown in FIG. 18, in this preferred embodiment, one or more extendable wheels (19) may be positioned within the low profile wheel slots (45). As generally shown in the figures, the extendable wheels (19) may be rotatable in 360° degrees and may further include wheel guards to prevent objects from becoming entangled in the wheels.

Such extendable wheels (19) may be coupled with a wheel coupler (20) that may further be secured to a retractable joint (57). In this preferred embodiment, when the base support (18) is in its retracted position, the extendable wheels (19), through the action of the wheel coupler (20) may also be configured to be in a retracted position such that they are positioned internally within the base support (19). Such retraction may be manually accomplished by a user applying a force to push the extendable wheels (19) into a low profile wheel slots (45) until they are past the lower plane of the base support (18) at which point the retractable joint (57) may be in a locked position such that the extendable wheels (19) may be secured with the low profile wheel slots (45). In certain embodiments, retractable joint (57) may include a mechanical joint, a spring-levered joint, as well as a hydraulic joint and the like.

The action of the retractable joint (57) may be tied to the movement action of the base support (18) relative to the telescoping arms (39, 40). In this embodiment, as the base support is extended, the extendable wheels (19), again through the action of the retractable joint (57) may also be extended until they reach a fully extendable position and may further be locked into place. In certain embodiments, one or more extendable wheels (19) may be locked into their fully extended position through the action of the wheel coupler (20), which may include a mechanical coupling, a spring-levered coupling, as well as a hydraulic coupling in certain embodiments. Alternatively, as the base support is retracted or collapsed, the extendable wheels (19), again through the action of the retractable joint (57), may also be retracted until they reach a fully retracted position within the low profile wheel slots (45) and may further be held or locked into place. In certain embodiments, one or more extendable wheels (19) may be manually extended or retracted into their fully extended position through the action of the retractable joint (57) and/or wheel coupler (20).

Figure 11:
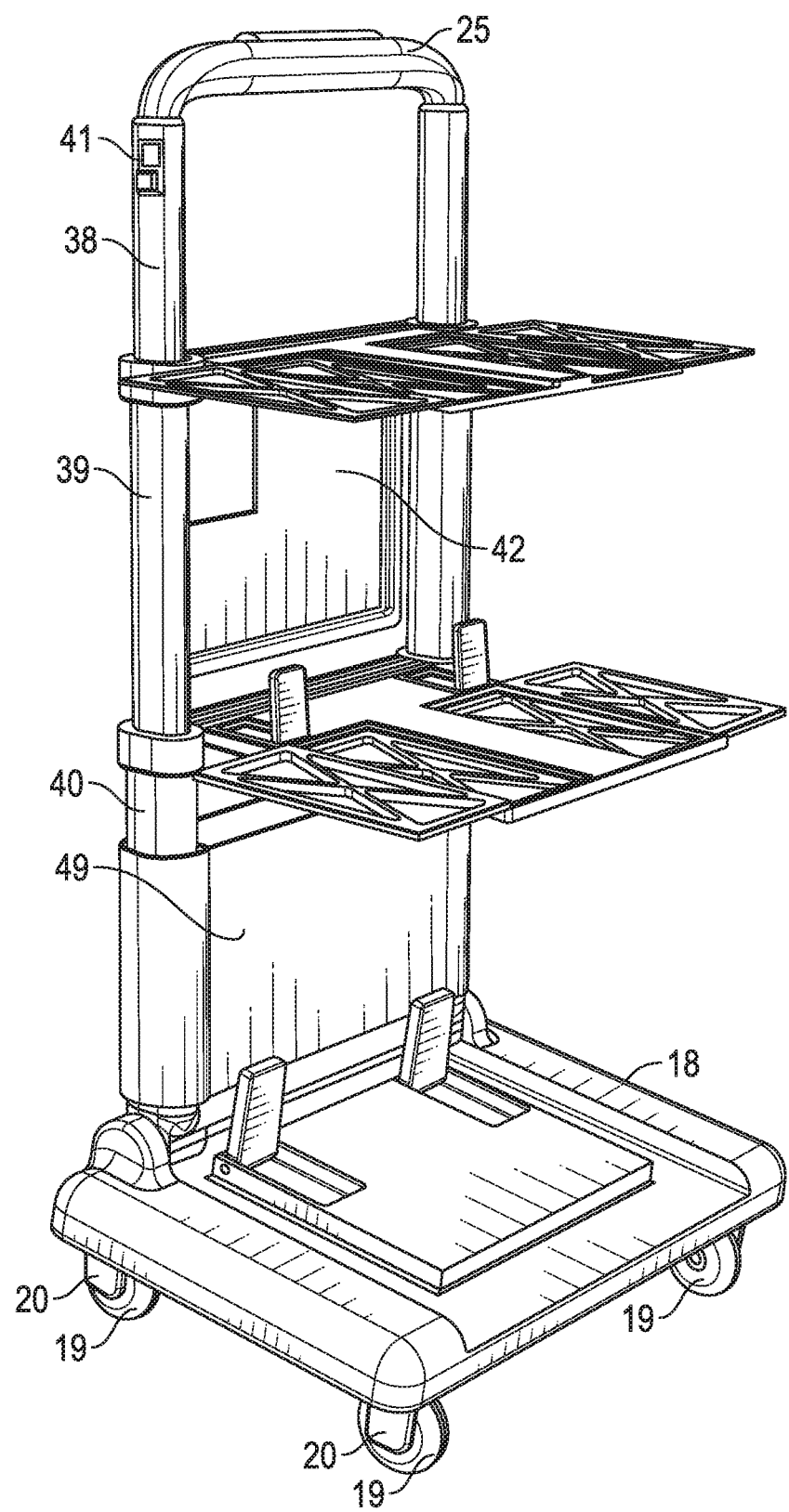
FIG. 11—is a perspective view of a modular collapsible cart in a fully extended position in one embodiment thereof.
Figure 12:
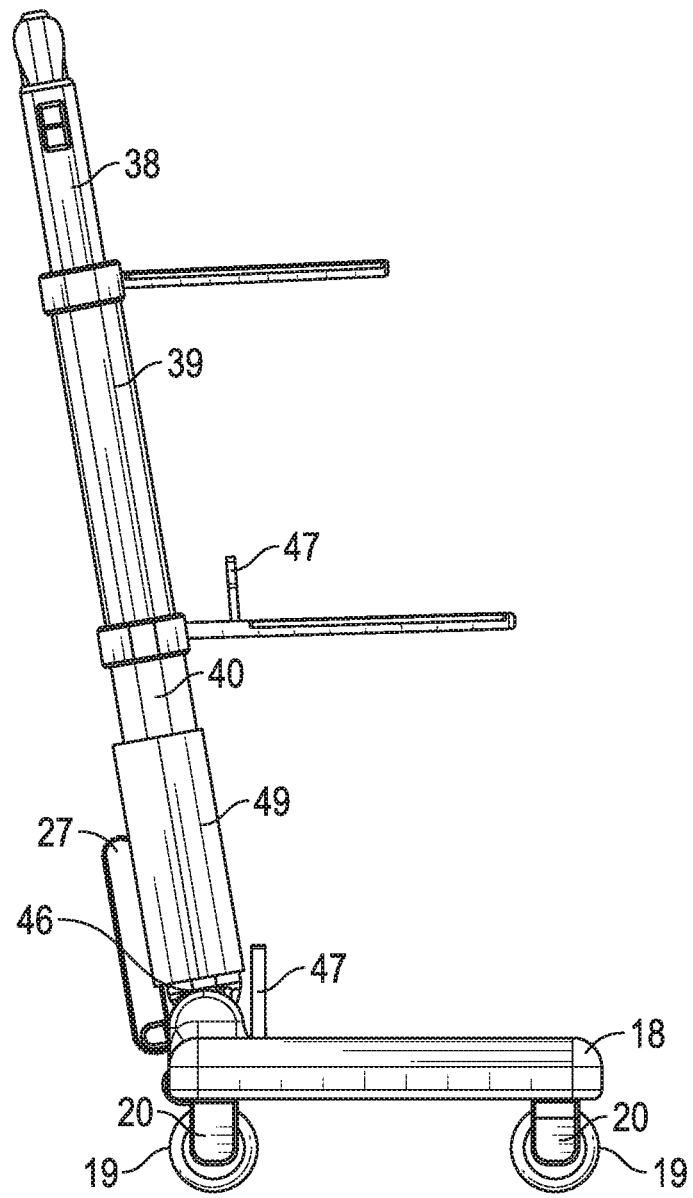
FIG. 12—is a side view of a modular collapsible cart in a fully extended position in one embodiment thereof.
Figure 13:
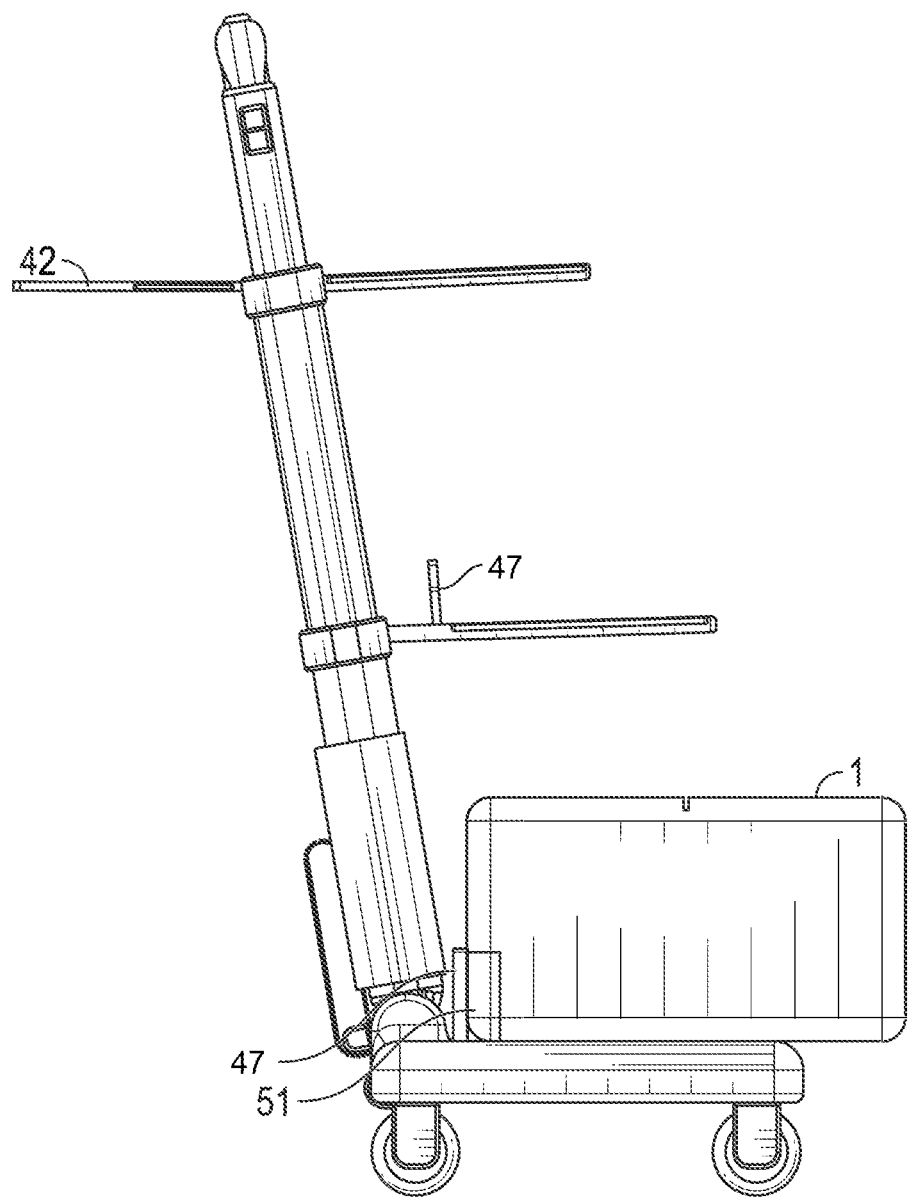
FIG. 13—is a side view of a modular collapsible cart coupled with a modular bag in a fully extended position in one embodiment thereof.
Figure 14:
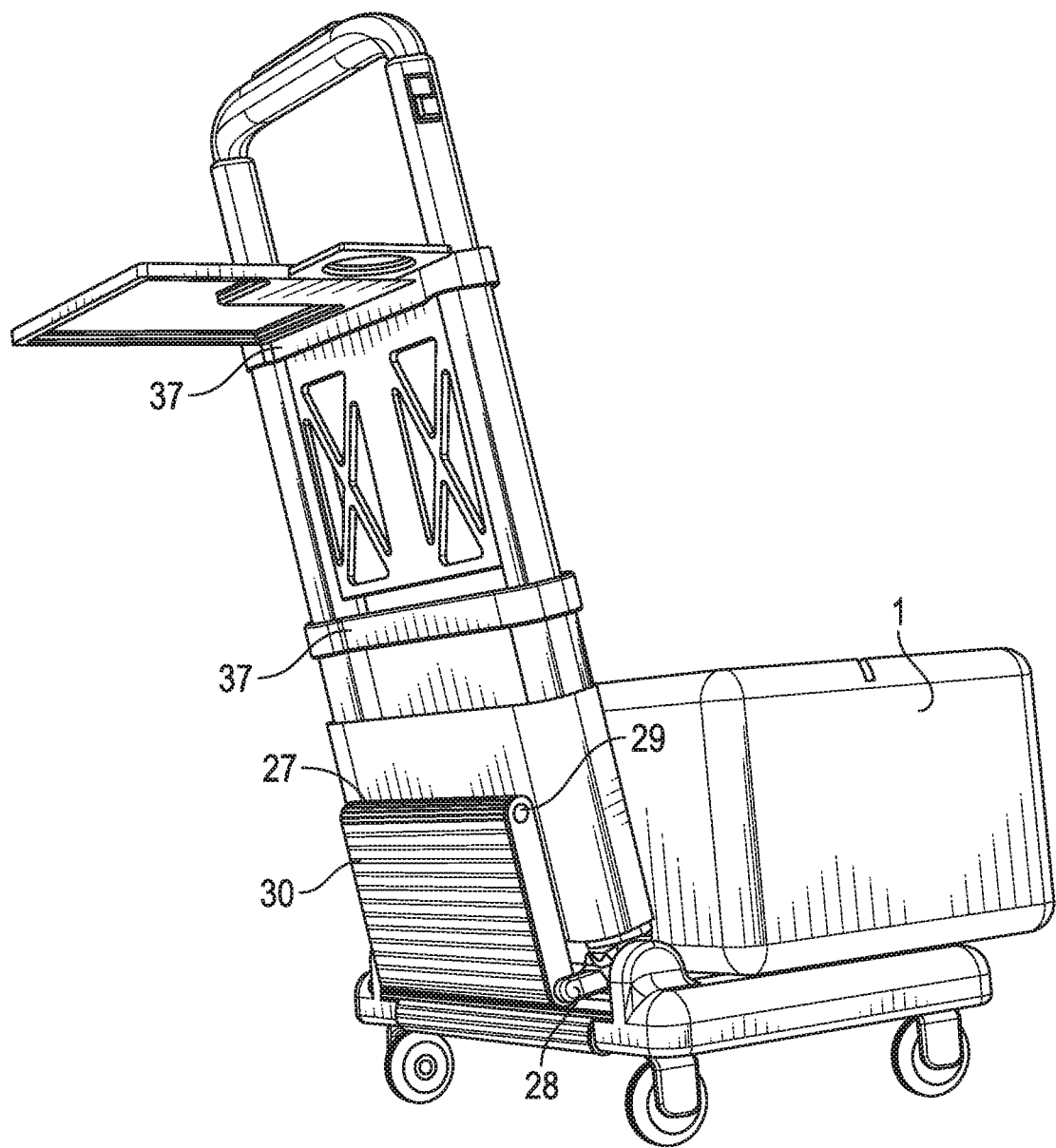
FIG. 14—is a rear perspective view of a modular collapsible cart coupled with a modular bag in a fully extended position in one embodiment thereof.
Figure 15:
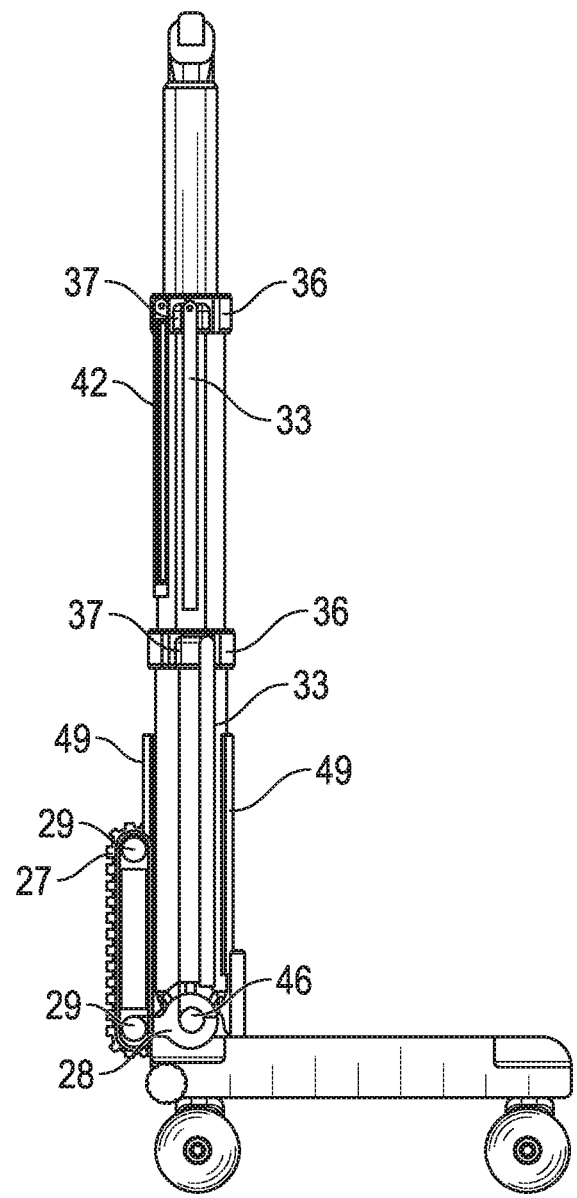
FIG. 15—is a side view of a modular collapsible cart with a plurality of expandable extensions in a retracted position where a first and a second telescoping arm are extended in one embodiment thereof.
Figure 16:
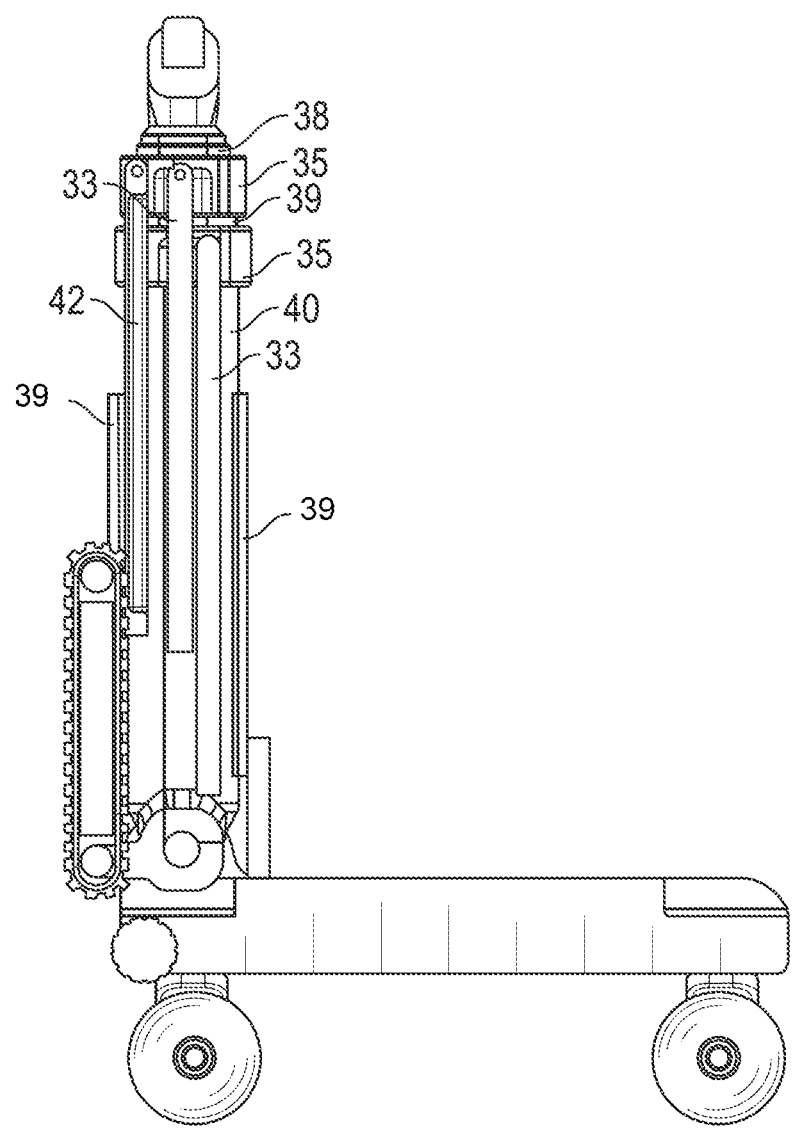
FIG. 16—is a side view of a modular collapsible cart with a plurality of expandable extensions in a nested position where a first and a second telescoping arm are retracted in one embodiment thereof.

Referring again to FIGS. 10-23, the modular collapsible cart (32) may be configured to support one or more modular bags or other items. In a preferred embodiment, the base support (18) may have sufficient surface area to support an industry standard large sized suitcase. (Such configurations and dimensions being generally known by those of ordinary skill in the art). In one preferred embodiment, a base support (18) may include one, or even a plurality of collapsible joint couplers (47). As shown in FIGS. 10-11, one or more collapsible joint couplers (47) may be positioned along the top surface of the base support (18) and may generally abut the telescoping arms (39,40) as generally shown. The collapsible joint couplers (47) may be coupled to the base support (18) through a rotational joint that may further be positioned in low profile coupler slot (48). In this configuration, when the modular collapsible cart (32) is in an extended position, a collapsible joint coupler (47) may also be in an extended position, for example through a spring or other mechanical rotational joint as generally shown. Alternatively, when the modular collapsible cart (32) is in a collapsed position, the collapsible joint coupler (47) may be inserted into the low profile coupler slot (48) allowing the cart to more fully collapse and maintain a desired low profile.

The invention may include a novel coupling system to secure one or more modular bags (1) to a modular collapsible cart (32). In the embodiment shown in FIG. 13, a modular bag (1) may include a coupler slot (51) that may be configured to secure a corresponding collapsible joint coupler (47) in a tongue and groove joint configuration that may prevent side-to-side movement of the bag as it is being transported. In a preferred embodiment, a coupler slot (51) may be formed as an external ruggedized surface, such as a hard plastic or rubberized surface, that may form a secure connection with a collapsible joint coupler (47). In some embodiments, extended projections, or tractable surfaces along a coupler slot (51) may form a generally more secure securement. Additional embodiments may include one or more couplers that may form a mechanical or even magnetic coupling with between the coupler slot (51) and collapsible joint coupler (47).

A modular collapsible cart (32) may include one, or preferably a plurality of extendable interlocked telescoping arms. As shown in FIGS. 10-23, in a preferred embodiment, a first telescoping arm (38) may be interlocked with a second telescoping arm (39). As further shown in the figures, in a preferred embodiment, a first telescoping arm (38) may be depressed and positioned within the second telescoping arm (39). The interlocked first and second telescoping arms (38, 39) may further be depressed and positioned within a telescoping arm housing (40). The inverse movement action of the first and second telescoping arms may be accomplished such that the first telescoping arm (38) and second telescoping arm (39) may be retracted from the telescoping arm housing (40) and preferably locked into a desired position. As should be noted from the figures, while in some embodiments a single first telescoping arm (38) and a second telescoping arm (39) may be employed, in a preferred embodiment, at least two first and two second telescoping arms (38, 39) positioned in a parallel orientation with one another and preferably coupled by a handle (25) may be preferably embodied in the invention.

Again referring to FIG. 11, one or more release (41) mechanisms may be positioned on one or more telescoping arms, or other accessible location. This release (41) mechanism may disengage the interlocked first and second telescoping arms (38, 39). In one embodiment, a release (41) mechanism may disengage a lock, mechanical block, or other coupler mechanism that may lock the interlocked first and second telescoping arms (38, 39) in an extended position. In this embodiment, one or more release (41) mechanisms may further disengage tractable support (46) mechanically coupling the base support (18) and, in this embodiment, the telescoping arm housings (40). Once the tractable support (46) is disengaged by the release (41) mechanism(s), the base support (18) and telescoping arm housings (40) may be rotatably collapsed and brought into a low-profile collapsed configuration as demonstrated in FIG. 17. In this low-profile collapsed configuration, as generally demonstrated in the figures, the various components of the modular collapsible cart (32) may be interlaced to minimize the cart's profile and dimension. For example, the base support (18) may include one or more low profile housing base slots (50) that may be configured to secure a telescoping arm housing (40) or mobile track (27) system as generally shown herein. In this embodiment, a tractable support (46) may be configured to hold the components in a collapsed configuration as generally shown. In one embodiment, a tractable support (46) may include a mechanical or other coupler that may be used to secure the collapsible cart (32) in a collapsed position. In alternative embodiments, the tractable support (46) may include a friction coupler, such that the application of a certain level of force will disengage the tractable support (46) and allow the expansion of the components of the collapsible cart (32).

It should be noted that in certain embodiments, the tractable support (46) may be positioned into a plurality of angle positions, preferably up at least 180° degrees of motion. For example, based on a user's preference, a user may engage a release (41) mechanism such that the tractable support (46) may be disengaged from an approximately vertical orientation and be secured in an angle orientation, preferably extended away from the base support (18). In this preferred embodiment, a user may obtain improve leverage while transporting, for example, a heavy load, while also maintaining, in this embodiment, the base support (18) in an approximately horizontal configuration which may allow weigh distribution to be evenly spread to all four extendable wheels (19).

Referring now to FIGS. 10, the collapsible cart (32) may include a plurality of extendable surfaces that may be configured to secure one or more modular bags (1) or other like items. In one preferred embodiment, a plurality of expandable extension (33) surfaces may be positioned in a stacked configuration and further configured to expand to accommodate a modular bag (1). In this embodiment, one or more nested support (34) surfaces may be engaged with an expandable extension (33) surface such that they may be slidably expanded to increase the supporting surface area of the expandable extension (33) surfaces. While the figures may generally show a slide coupler configuration between a nested support (34) and expandable extension (33) surface, multiple engagements may be considered, including rotational or swivel joints, as well cantilevered connections and the like. As demonstrated in FIGS. 10-11, one or more expandable extension (33) surfaces may also include one or more collapsible joint couplers (47) that may further be configured to be positioned with a corresponding low profile coupler slot (48). A modular bag (1) may be secured to expandable extension (33) surface through the interaction of a coupler slot (51) and collapsible joint coupler (47) as described above.

In the preferred embodiment generally shown in the figures, an expandable extension (33) surface may be coupled with one or more telescoping arms through nested support housing (35) and may further be supported by a cross-linking support rod (37) that may be further coupled with a support joint (36). In this preferred embodiment, expandable extension (33) or expandable extension surface (33), the terms being generally interchangeable, may be extended and/or collapsed through action of the support joint (36) preferably positioned on or with nested support housing (35). Further, in this configuration, one or more expandable extension (33) surfaces may be raised or lowered in conjunction with the telescoping arms.

In the preferred embodiment shown in FIG. 10, an expandable extension (33) surface is coupled with a telescoping arm housing (40) which a second, upper expandable extension (33) surface is coupled with a second telescoping arm (39). The upper and lower expandable extension (33) surfaces are coupled with their respective nested support housings (35) in an off-set configuration. In this embodiment, when the first and second telescoping arms (38, 39) are depressed the upper and lower expandable extension (33) surfaces are also rotated downward into their collapsed positions and placed in a nested configuration inside of a nested housing (49) as generally demonstrated in FIGS. 15-16. In this nested configuration, the upper and lower expandable extension (33) surfaces may maximize the use of space between the telescoping arms (38, 39) and support base (18) when in the collapsed position, further maintaining an optimal low profile and compact collapsed configuration. In a preferred embodiment, such upper and lower expandable extensions (33) may be positioned with a nested housing (49) structure which may protect and contain the nested components. In certain embodiments, one or more nested support housings (35) may be responsive to one or more release (41) mechanisms such that upon disengagement by a user, the expandable extension (33) surfaces may be allowed to rotatably be positioned into their nested collapsible format. In still alternative embodiments, expansion of the modular collapsible cart (32) may automatically engage one or more nested support housings (35) and extend the expandable extension (33) surfaces which may further be secured in a substantially horizontal configuration as demonstrated in the figures.

Referring to FIG. 10, in one embodiment a modular collapsible cart (32) may include one or more nested tables (42). In this preferred embodiment, a nested table (42) may be coupled with one or a plurality of nested support housings (35) and may be coupled with a support rod (37) that may be further rotatably coupled with a support joint (36). In other embodiment, one or more nested tables (42) may be coupled with adjustable nested support housings (35) that may be slidably engaged along one, or both of the telescoping arms. In this manner, the height and position of the nested table (42) may be customized according to a user's preference. In one embodiment, a nested table (42) may include a utility surface (43). In the preferred embodiment shown in the figures, a utility surface (43) may include, for example, a surface for use with a mouse or placement of a battery or other digital device. In another embodiment, a utility surface (43) may include an adaptable cup holder or general purpose carrying hook and the like. In the preferred embodiment shown in FIG. 10, a utility surface (43) may be position within a utility surface slot (44) and extended or retracted according to a user's preference.

As generally shown in FIG. 10, a nested table (42) may be coupled with one or more nested support housings (35) in an off-set configuration. In this embodiment, when the first and second telescoping arms (38, 39) are depressed, the nested table (42) may also be rotated downward into its collapsed position and placed in a nested configuration in relation to the upper and lower expandable extension (33) surfaces as generally demonstrated in FIGS. 15-16. In this nested configuration, the nested table (42) may maximize the use of space between the telescoping arms (38, 39) and support base (18) when in the collapsed position, further maintaining an optimal low profile and compact collapsed configuration. In a preferred embodiment, such nested table (42) may be positioned with a nested housing (49) structure which may protect and contain the nested components.

Figure 17:
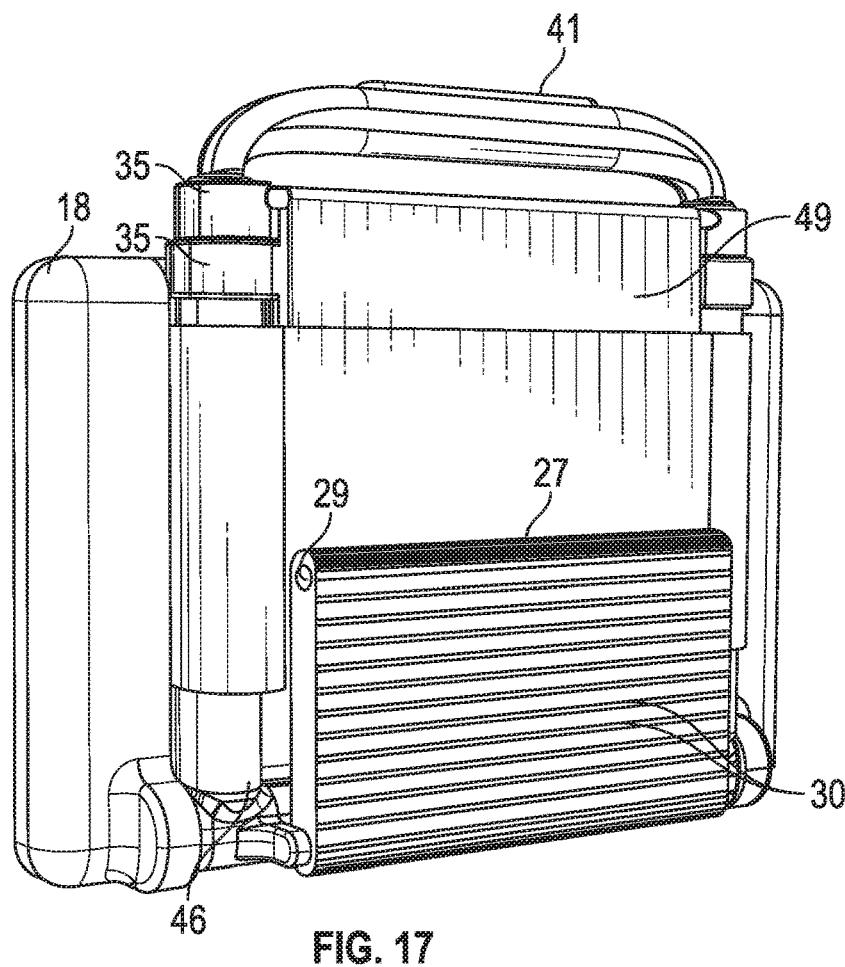
FIG. 17—is a rear perspective view of a modular collapsible cart having a mobile track in a fully collapsed configuration in one embodiment thereof.

As generally shown in FIGS. 17, in one preferred embodiment, a modular collapsible cart (32) may include a mobile track (27) that may be configured to assist a user lift the cart up the stairs or other irregular elevated surfaces. In this embodiment, a mobile track (27) may be configured to be positioned over two or more track supports (28), which in turn may be supported by one or more track bearings allowing the mobile track (27) to roll in response to an external force. In this embodiment, for example, a user may position the modular collapsible cart (32) against an elevated surface, such as a stair. In this position the mobile track (27) may be in contact with the front leading edge of the stair. When a user applies an upward/forward pulling force, which may be typical when trying to lift the modular collapsible cart (32) up the stairs, the mobile track (16) may be pressed against the leading edge of the stair surface, and may move in relation to the modular collapsible cart's (32) movement up the stairs, supported by the bearing supported track supports (28). In this manner, the mobile track (27) may provide a sliding surface that may assist a user lift and maneuver the modular collapsible cart (32) up the stairs or other irregular elevated surfaces.

In additional embodiments, the mobile track (27) may include a plurality of projections (30) that may catch the surface of, for example, a stair surface, and helping to generate the lift assist as described above. In another embodiment, a mobile track (27) may be configured to proceed only in a single direction. For example, the track supports (28) and bearings (29) may be geared or directionally blocked such that they may only allow the mobile track (27) to roll in a forward direction. In this configuration, if, for some reason, a user stalls while lifting the modular collapsible cart (32) up a stair, or other irregular elevated surface, the mobile track (27) may catch the stair ledge, for example, through a projection (30), and then be locked in place by the unidirectional track-supports/bearings (28)(29), supporting the modular collapsible cart (32) in place until the user re-exerts an upward/forward force to continue maneuvering the cart up the stairs. In a preferred embodiment, the mobile track (27) may be formed of a pliant or semi-pliant material such as a rubber or other composite material that may be sufficiently flexible to allow the rolling assist mechanism as described above, as well as provide sufficient buffer to a user maneuvering a modular collapsible cart (32) up an irregular elevated surface such as stairs.

In another preferred embodiment, the mobile track (27) may be formed from a material having a high frictional ratio. In this configuration, if, for some reason, a user stalls while lifting the modular collapsible cart (32) up a stair, or other irregular elevated surface, the mobile track (27) may catch the stair ledge and be held there by the friction generated between the stair surface and the mobile track (27), and then be locked in place by the unidirectional track-supports/ bearings (28)(29), supporting the modular collapsible cart (32) in place until the user re-exerts an upward/forward force to continue maneuvering the cart up the stairs. In one embodiment, a mobile track (27) may be motorized, such that when actuated, the mobile track may proceed in a forward or reverse motion to assist a user in while lifting the modular collapsible cart (32) up a stair, or other irregular elevated surface.

Figure 18:
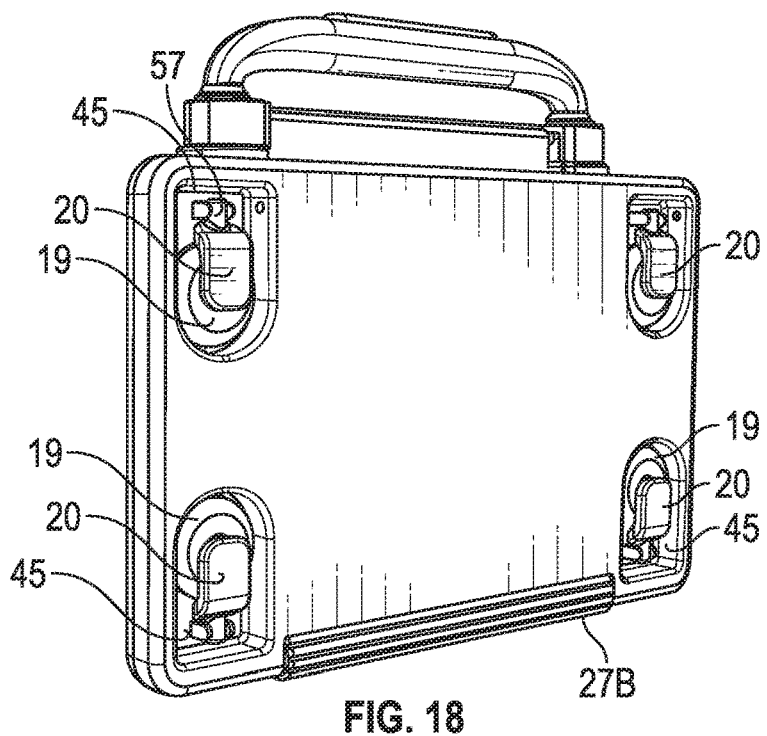
FIG. 18—is the bottom view of a base support having a plurality of extendable wheels in retracted positions in one embodiment thereof.
Figure 19:
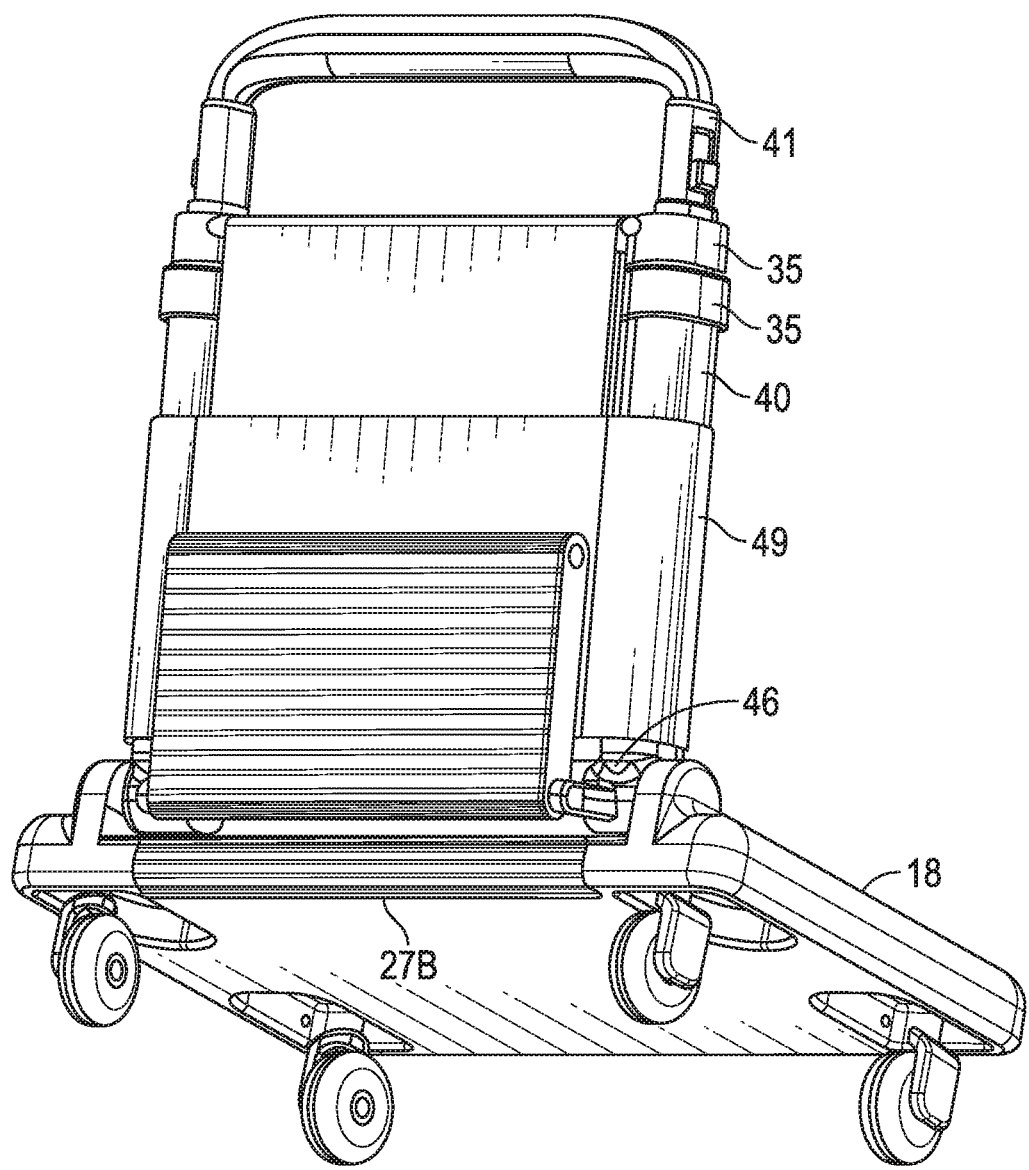
FIG. 19—is a bottom perspective view of a modular collapsible cart with a plurality of expandable extensions in a nested position where a first and a second telescoping arm are retracted in one embodiment thereof.
Figure 20:
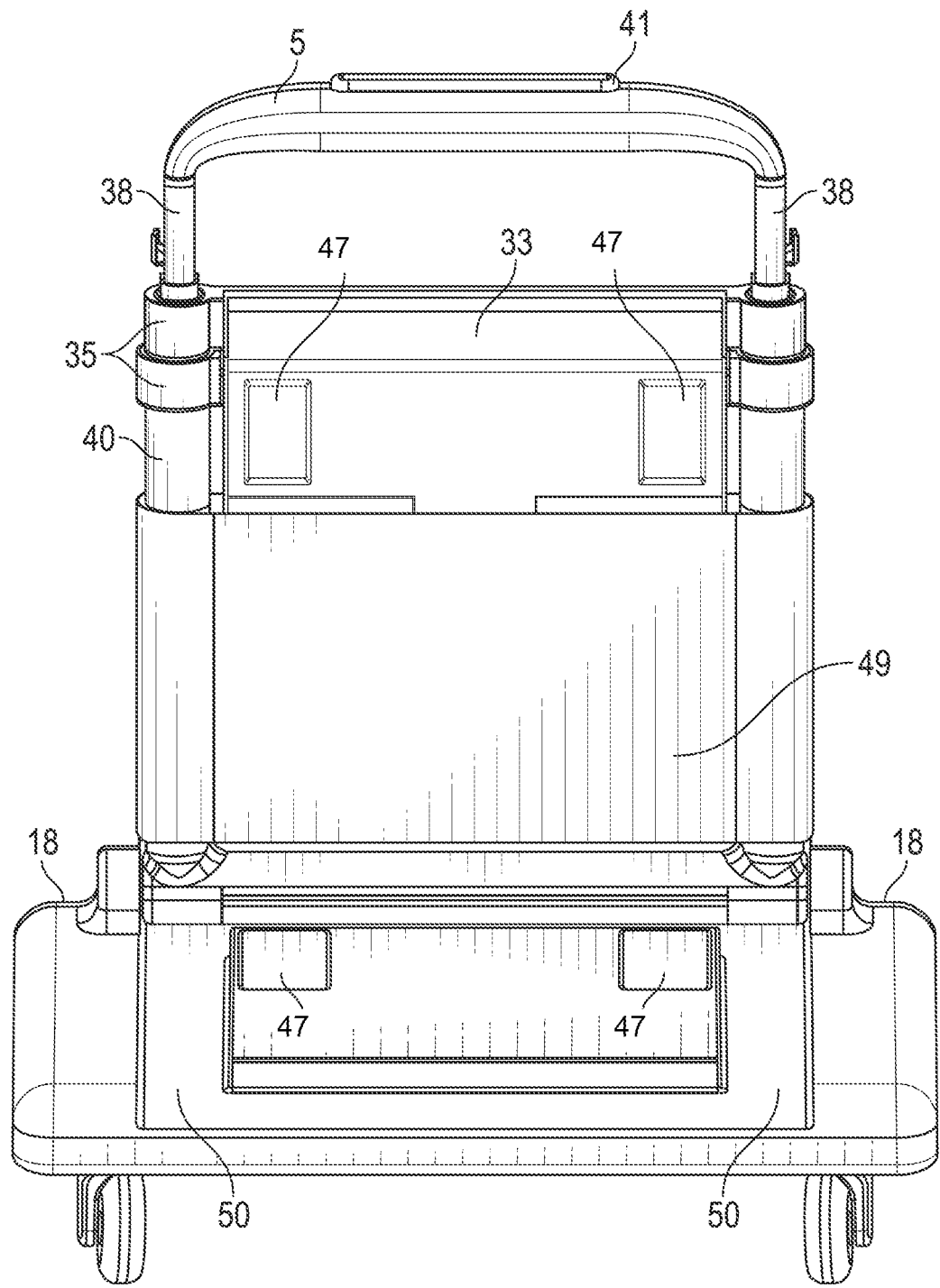
FIG. 20—is a front view of a modular collapsible cart with a plurality of expandable extensions in a nested position where a first and a second telescoping arm are retracted in one embodiment thereof.
Figure 21:
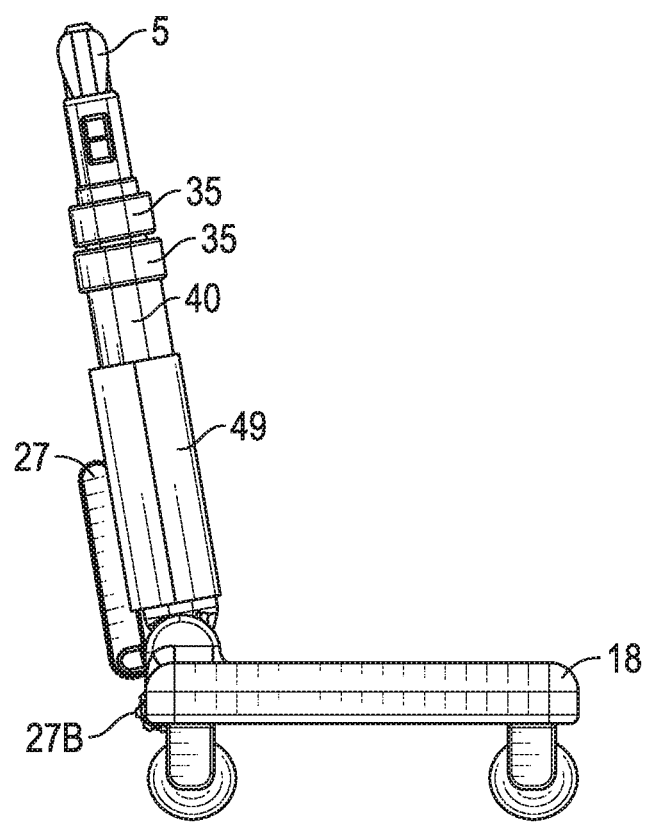
FIG. 21—is a side view of a modular collapsible cart with a plurality of expandable extensions in a nested position where a first and a second telescoping arm are retracted in one embodiment thereof.
Figure 22:
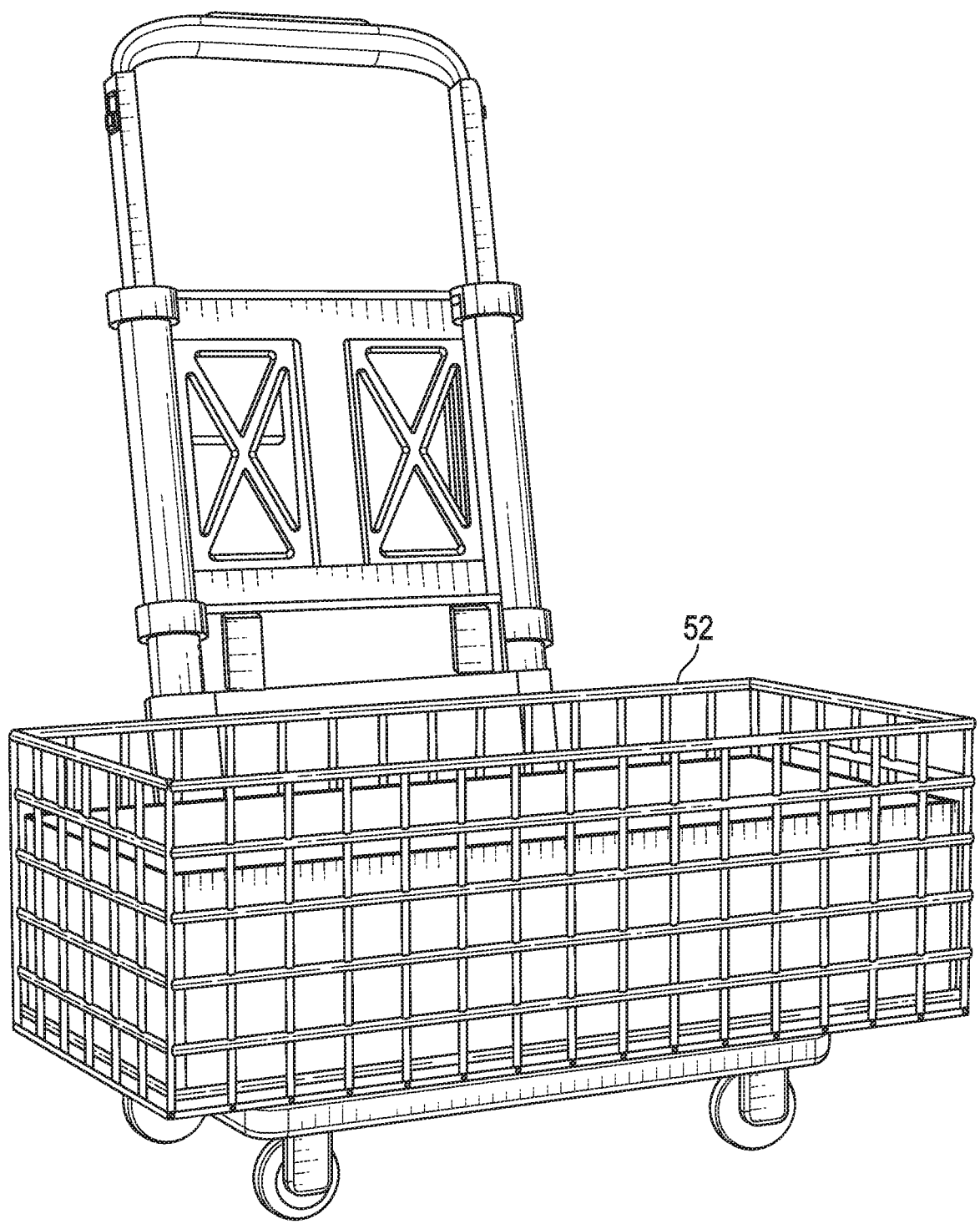
FIG. 22—is a front view of a modular collapsible cart coupled with a portable container in one embodiment thereof.
Figure 23:
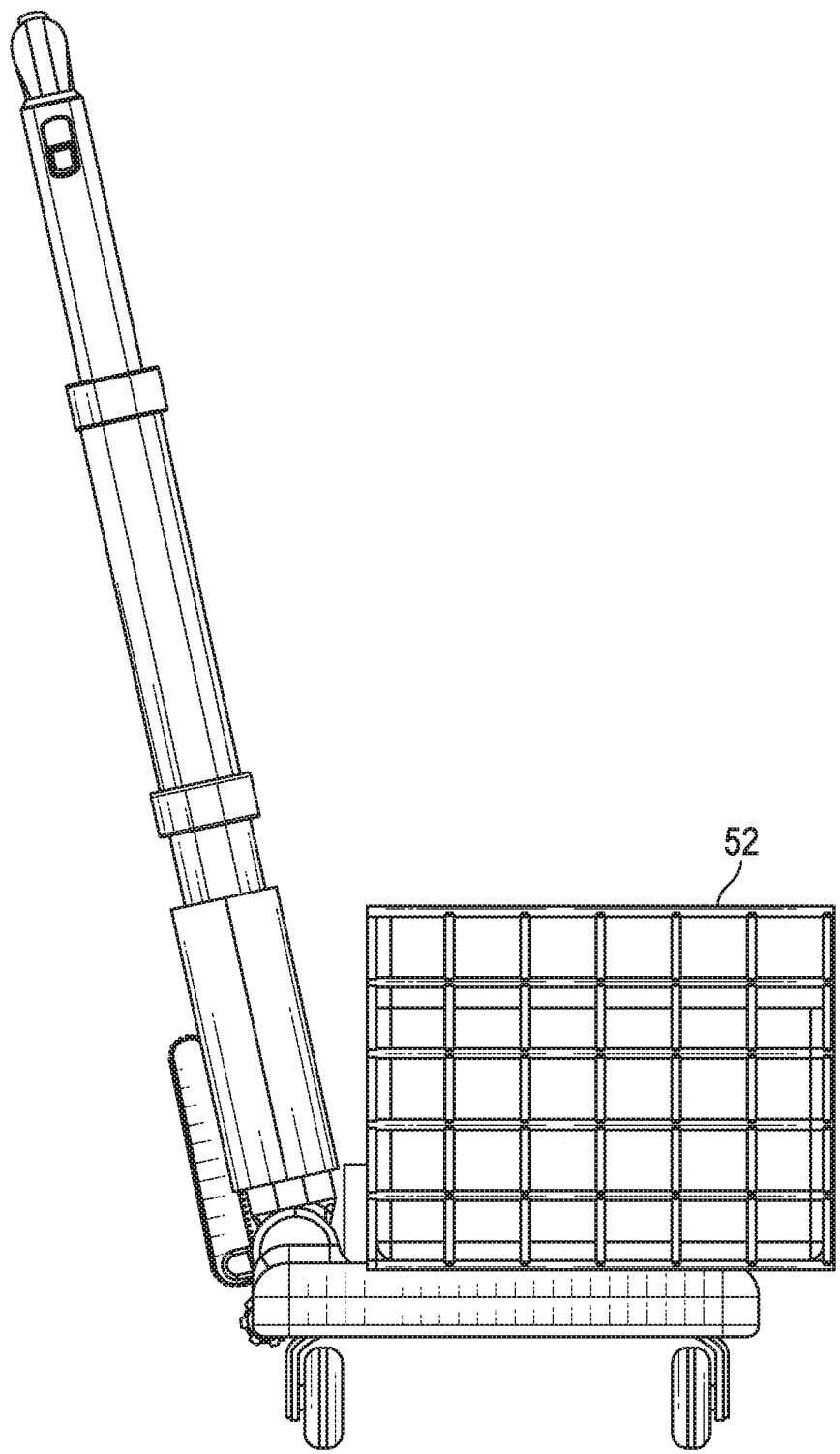
FIG. 23—is a front view of a modular collapsible cart coupled with a portable container in one embodiment thereof.

In another embodiment shown in FIG. 18, a modular collapsible cart (32) may include a secondary mobile track (27B). In this embodiment, a rotatable tube may form a rotatable surface that may be position on the leading edge of the back side of a modular collapsible cart (32). In this embodiment, when the cart may be in an extended position, it may be tipped towards the user that may be pulling the cart. This tipping action may allow this secondary mobile track (27B) to engage the ground and allow the cart to be rolled in a unidirectional or multidirectional direction.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves apparatus, systems, methods, and techniques as well as devices to accomplish a modular luggage system and the like. In this application, the improved techniques, including novel and unique methods and apparatus for a modular luggage system and the like are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupling method and/or technique, and or device." Such changes and alternative terms are to be understood to be explicitly included in the description.

Thus, the applicant(s) should be understood to have support to claim and make a statement of invention to at least: i) each of the methods, improvements and/or devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A modular collapsible cart comprising:
   a base support with a housing base;
   a plurality of extendable wheels secured to said base support;
   a nested housing;
   a tractable support coupled to said base support and said nested housing wherein said tractable support is configured to position said base support with said nested housing into an extended and collapsed formation;
   at least one extendable telescoping arm positioned within a telescoping arm housing, and wherein said at least one telescoping arm housing is nested within said nested housing;
   a plurality of expandable extension surfaces configured to be retracted and positioned in a nested formation with said nested housing base when in said collapsed formation, wherein said plurality of expandable extension surfaces are coupled to said at least one telescoping arm by an adjustable support wherein said adjustable support is offset such that the expandable extension surfaces are positioned adjacent and approximately parallel to one another when in the nested formation.

2. A modular collapsible cart as described in claim 1 and further comprising at least one nested table coupled with said at least one extendable telescoping arm.

3. A modular collapsible cart as described in claim 1 and further comprising at least one release configured to allow said at least one extendable telescoping arm to extend and retract.

4. A modular collapsible cart as described in claim 1 and further comprising at least one collapsible joint coupler configured to secure one or more modular bags wherein said collapsible joint coupler is positioned within a low profile coupler slot on said base support.

5. A modular collapsible cart as described in claim 1 and further comprising a mobile track secured to said base support through a track support wherein said mobile track is supported by a plurality of bearings which is configured to allow said mobile track to rotate around said bearings.

6. A modular collapsible cart as described in claim 1 wherein said base support comprises a base support having a low profile housing base slot.

7. A modular collapsible cart as described in claim 1 wherein said tractable support is configured to be adjusted up to at least 180° degrees.

8. A modular collapsible cart as described in claim 7 wherein said tractable support is configured to be locked into position.

9. A modular collapsible cart as described in claim 1 wherein said plurality of expandable extension surfaces each have at least one nested support.

10. A modular collapsible cart as described in claim 9 wherein said plurality of expandable extension surfaces comprises a plurality of expandable extension surfaces each having at least one nested support coupled through a slide engagement.

11. A modular collapsible cart as described in claim 1 wherein said plurality of expandable extension surfaces comprises a plurality of expandable extension surfaces each coupled with a nested support housing.

12. A modular collapsible cart as described in claim 1 wherein said plurality of expandable extension surfaces comprises a first and a second expandable extension surfaces each coupled with a nested support housing.

13. A modular collapsible cart as described in claim 12 wherein said first and second plurality of expandable extension surfaces each coupled with a nested support housing in an off-set configuration allowing said first and second expandable extension surfaces to form a nested configuration when said modular collapsible cart is in a collapsed position.

14. A modular collapsible cart as described in claim 13 wherein said second expandable extension surface is coupled with a nested support housing that is coupled to said telescoping arm housing.

15. A modular collapsible cart as described in claim 13 wherein said first expandable extension surface is coupled with a nested support housing that is coupled to said at least one telescoping arm.

16. A modular collapsible cart as described in claim 1 and further comprising at least one nested table having at least one utility surface that is configured to be positioned within a utility surface slot.

17. A modular collapsible cart as described in claim 1 and further comprising at least one mobile track having at least one unidirectional track bearing.

18. A modular collapsible cart as described in claim 17 wherein said mobile track comprises a mobile track having at least one unidirectional track support.

19. A modular collapsible cart as described in claim 17 wherein said mobile track comprises a mobile track having a plurality mobile track having a plurality of projections.

20. A modular collapsible cart comprising:
   a base support configured to secure a modular bag or portable container;
   a plurality of extendable wheels secured to said base support through at least one wheel coupler which is further coupled with a retractable joint which is configured to allow said extendable wheels to be positioned within a low profile wheel slot;
   a tractable support coupled to said base support wherein said tractable support is configured to position said base support into an extended and collapsed formation;

at least two telescoping arms coupled with said tractable support and further coupled with a handle;

a plurality of expandable extension surfaces configured to be retracted and positioned in a nested formation, wherein said plurality of expandable extension surfaces are coupled to said the telescoping arms by an adjustable support wherein said adjustable support is offset such that the expandable extension surfaces are positioned adjacent and approximately parallel to one another when in the nested formation;

a nested table coupled with the telescoping arms and configured to be retracted and positioned in a nested formation with a telescoping arm housing securing the telescoping arms when in said collapsed formation;

at least one release configured to allow said two telescoping arms to extend and retract;

at least one collapsible joint coupler positioned within a low profile coupler slot on said base support; and a mobile track secured to said base support through a track support wherein said mobile track is supported by a plurality of bearing which are configured to allow said mobile track to rotate around said bearings.

\* \* \* \* \*